(12) United States Patent
Jhunjhunwala et al.

(10) Patent No.: US 11,943,661 B2
(45) Date of Patent: Mar. 26, 2024

(54) TECHNIQUES FOR CONFIGURING A BITRATE REQUEST

(71) Applicant: QUALCOMM Incorporated, San Diego, CA (US)

(72) Inventors: Vashishth Jhunjhunwala, Hyderabad (IN); Srinivasa Ragimakalahally Konappa, Bangalore (IN); Shankar Ganesh Lakshmanaswamy, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 17/400,651

(22) Filed: Aug. 12, 2021

(65) Prior Publication Data

US 2023/0050971 A1 Feb. 16, 2023

(51) Int. Cl.
*H04W 28/22* (2009.01)
*H04W 24/08* (2009.01)

(52) U.S. Cl.
CPC ......... *H04W 28/22* (2013.01); *H04W 24/08* (2013.01)

(58) Field of Classification Search
CPC .............................. H04W 28/22; H04W 24/08
See application file for complete search history.

(56) References Cited

U.S. PATENT DOCUMENTS

| 11,252,612 | B2 * | 2/2022 | Chang | .................. H04W 28/22 |
| 2012/0108250 | A1 * | 5/2012 | Ahn | ...................... H04L 1/1671 |
| | | | | 455/450 |

| 2019/0159071 | A1 * | 5/2019 | Yavuz | .................. H04W 80/08 |
| 2019/0215729 | A1 * | 7/2019 | Oyman | ............... H04L 65/1016 |
| 2020/0059818 | A1 * | 2/2020 | Chang | ................... H04W 28/22 |
| 2020/0236593 | A1 * | 7/2020 | Yavuz | ................. H04L 65/1104 |

(Continued)

FOREIGN PATENT DOCUMENTS

WO WO-2018085140 A1 5/2018

OTHER PUBLICATIONS

Ericsson: "RAN Assisted Codec Rate Selection and Adaptation", 3GPP TSG-RAN WG2 #95, R2-165617, 3rd Generation Partnership Project, Mobile Competence Centre, 650, Route Des Lucioles, F-06921 Sophia-Antipolis Cedex, France, vol. RAN WG2, No. Gothenburg, Sweden, Aug. 22, 2016-Aug. 26, 2016, Aug. 21, 2016, pp. 1-15, XP051127046, p. 7-p. 8, figure 6, table 2.

(Continued)

*Primary Examiner* — Anh Vu H Ly
*Assistant Examiner* — Hector Reyes
(74) *Attorney, Agent, or Firm* — Holland & Hart LLP/Qualcomm Incorporated

(57) ABSTRACT

Methods, systems, and devices for wireless communications are described. A user equipment (UE) may calculate one or more parameters associated with a quality of communications between the UE and a base station. The UE may determine a bitrate for performing the communications based on the one or more calculated parameters prior to receiving a bitrate recommendation from the base station, and the UE may transmit, prior to receiving the bitrate recommendation from the base station, a request to perform the communications in accordance with the determined bitrate. The base station may determine whether to accept the requested bitrate, and perform the communications with the UE in accordance with the determination.

24 Claims, 15 Drawing Sheets

(56) References Cited

U.S. PATENT DOCUMENTS

| | | | | |
|---|---|---|---|---|
| 2021/0105216 A1* | 4/2021 | Dai | .................... | H04L 41/0853 |
| 2021/0195466 A1* | 6/2021 | Baek | .................... | H04W 28/12 |
| 2023/0041659 A1* | 2/2023 | Lin | .................. | H04W 28/0268 |
| 2023/0354103 A1* | 11/2023 | Dees | .................... | H04W 28/22 |

OTHER PUBLICATIONS

International Search Report and Written Opinion—PCT/US2022/036493—ISA/EPO—dated Nov. 29, 2022 (2105050WO).
Kyocera: "Other Triggering Needs with Bitrate Query", 3GPP TSG-RAN WG2 #97, R2-1701673_EVOLTE, 3rd Generation Partnership Project, Mobile Competence Centre, 650, Route Des Lucioles, F-06921 Sophia-Antipolis Cedex, France, vol. RAN WG2, No. Athens, Greece, Feb. 13, 2017-Feb. 17, 2017, Feb. 12, 2017, pp. 1-5, XP051212256, p. 1, Section 2.1—p. 3.
Nokia, et al., "RAN-Recommended Bit Rate Restriction", 3GPP TSG-RAN WG2 Meeting #99, 36300_CR1053RI_(REL-14)_R2-1709739, 3rd Generation Partnership Project, Mobile Competence Centre, 650, Route Des Lucioles, F-06921 Sophia-Antipolis Cedex, France, vol. RAN WG2, No. Berlin, Germany, Aug. 21, 2017-Aug. 25, 2017, Sep. 10, 2017, 2 Pages, XP051323189, p. 2, figures 23.15.1-2.

* cited by examiner

Bitrate request 210

TECHNIQUES FOR CONFIGURING A BITRATE REQUEST

FIELD OF TECHNOLOGY

The following relates to wireless communications, including techniques for configuring a bitrate request.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a user equipment (UE) may perform communications with a base station. To improve or maintain the communications, the bitrate associated with performing the communications may be adjusted. Techniques for adjusting the bitrate may be improved.

SUMMARY

The described techniques relate to improved methods, systems, devices, and apparatuses that support techniques for configuring a bitrate request. Generally, the described techniques provide for methods of adjusting a bitrate being used for communications between multiple devices, such as a user equipment (UE) and base station. A UE may calculate one or more parameters (e.g., jitter, reference signal received quality (RSRQ), a signal-to-interference-plus-noise ratio (SINR), or a combination thereof) associated with a quality of communications between the UE and a base station. The UE may determine a bitrate for performing the communications based on the one or more calculated parameters prior to receiving a bitrate recommendation from the base station, and the UE may transmit, prior to receiving the bitrate recommendation from the base station, a request to perform the communications in accordance with the determined bitrate. The base station may determine whether to accept the requested bitrate, and perform the communications with the UE in accordance with the determination.

A method for wireless communications at a user equipment (UE) is described. The method may include calculating one or more parameters associated with a quality of communications between the UE and a base station, determining a bitrate for performing the communications based on the one or more calculated parameters prior to receiving a bitrate recommendation from the base station, and transmitting, prior to receiving the bitrate recommendation from the base station, a request to perform the communications in accordance with the determined bitrate.

An apparatus for wireless communications is described. The apparatus may include a processor, memory coupled with the processor, and instructions stored in the memory. The instructions may be executable by the processor to cause the apparatus to calculate one or more parameters associated with a quality of communications between the UE and a base station, determine a bitrate for performing the communications based on the one or more calculated parameters prior to receiving a bitrate recommendation from the base station, and transmit, prior to receiving the bitrate recommendation from the base station, a request to perform the communications in accordance with the determined bitrate.

Another apparatus for wireless communications is described. The apparatus may include means for calculating one or more parameters associated with a quality of communications between the UE and a base station, means for determining a bitrate for performing the communications based on the one or more calculated parameters prior to receiving a bitrate recommendation from the base station, and means for transmitting, prior to receiving the bitrate recommendation from the base station, a request to perform the communications in accordance with the determined bitrate.

A non-transitory computer-readable medium storing code for wireless communications is described. The code may include instructions executable by a processor to calculate one or more parameters associated with a quality of communications between the UE and a base station, determine a bitrate for performing the communications based on the one or more calculated parameters prior to receiving a bitrate recommendation from the base station, and transmit, prior to receiving the bitrate recommendation from the base station, a request to perform the communications in accordance with the determined bitrate.

Some examples of the method, apparatuses, and non-transitory computer-readable medium described herein may further include operations, features, means, or instructions for receiving, from the base station, an indication of an acceptance by the base station to use the determined bitrate.

In some examples of the method, apparatuses, and non-transitory computer-readable medium described herein, receiving the indication of the acceptance may include operations, features, means, or instructions for receiving the bitrate recommendation after transmitting the request, where the bitrate recommendation includes the determined bitrate.

In some examples of the method, apparatuses, and non-transitory computer-readable medium described herein, receiving the bitrate recommendation may include operations, features, means, or instructions for receiving a medium access control message including a logical channel identifier, where the logical channel identifier indicates the determined bitrate.

Some examples of the method, apparatuses, and non-transitory computer-readable medium described herein may further include operations, features, means, or instructions for receiving, from the base station after transmitting the request, the bitrate recommendation, where the bitrate recommendation may be different than the determined bitrate.

In some examples of the method, apparatuses, and non-transitory computer-readable medium described herein, receiving the bitrate recommendation may include operations, features, means, or instructions for receiving a medium access control message including a logical channel identifier, where the logical channel identifier indicates the bitrate recommendation.

Some examples of the method, apparatuses, and non-transitory computer-readable medium described herein may further include operations, features, means, or instructions for receiving, from the base station, an indication that the base station rejected the determined bitrate.

Some examples of the method, apparatuses, and non-transitory computer-readable medium described herein may further include operations, features, means, or instructions for identifying a failure by the UE to receive an indication that the base station accepts the determined bitrate and refraining from switching bitrates to the determined bitrate based on the identification.

Some examples of the method, apparatuses, and non-transitory computer-readable medium described herein may further include operations, features, means, or instructions for starting a bitrate request timer upon transmitting the request and refraining from transmitting a second request while the bitrate request timer may be running.

Some examples of the method, apparatuses, and non-transitory computer-readable medium described herein may further include operations, features, means, or instructions for identifying that the bitrate request timer may have expired and transmitting the second request to perform the communications in accordance with the determined bitrate.

In some examples of the method, apparatuses, and non-transitory computer-readable medium described herein, transmitting the request may include operations, features, means, or instructions for transmitting a medium access control message including a logical channel identifier, where the logical channel identifier indicates the request.

In some examples of the method, apparatuses, and non-transitory computer-readable medium described herein, calculating one or more parameters may include operations, features, means, or instructions for calculating a jitter, a delay, a reference signal received quality, a signal-to-interference-plus-noise ratio, or a combination thereof associated with communications between the UE and the base station.

In some examples of the method, apparatuses, and non-transitory computer-readable medium described herein, the request includes an indication to increase a current bitrate or decrease the current bitrate being used for communications between the UE and the base station.

A method for wireless communications at a base station is described. The method may include receiving, from a UE, prior to transmitting a bitrate recommendation to the UE, a requested bitrate for communications between the UE and the base station, determining whether to accept the requested bitrate, and performing the communications with the UE in accordance with the determination.

An apparatus for wireless communications is described. The apparatus may include a processor, memory coupled with the processor, and instructions stored in the memory. The instructions may be executable by the processor to cause the apparatus to receive, from a UE, prior to transmitting a bitrate recommendation to the UE, a requested bitrate for communications between the UE and the base station, determine whether to accept the requested bitrate, and perform the communications with the UE in accordance with the determination.

Another apparatus for wireless communications is described. The apparatus may include means for receiving, from a UE, prior to transmitting a bitrate recommendation to the UE, a requested bitrate for communications between the UE and the base station, means for determining whether to accept the requested bitrate, and means for performing the communications with the UE in accordance with the determination.

A non-transitory computer-readable medium storing code for wireless communications is described. The code may include instructions executable by a processor to receive, from a UE, prior to transmitting a bitrate recommendation to the UE, a requested bitrate for communications between the UE and the base station, determine whether to accept the requested bitrate, and perform the communications with the UE in accordance with the determination.

Some examples of the method, apparatuses, and non-transitory computer-readable medium described herein may further include operations, features, means, or instructions for transmitting, to the UE, an indication of an acceptance by the base station to use the determined bitrate based on determining to accept the requested bitrate.

In some examples of the method, apparatuses, and non-transitory computer-readable medium described herein, transmitting the indication of the acceptance may include operations, features, means, or instructions for transmitting the bitrate recommendation after receiving the requested bitrate, where the bitrate recommendation includes the requested bitrate.

In some examples of the method, apparatuses, and non-transitory computer-readable medium described herein, transmitting the bitrate recommendation may include operations, features, means, or instructions for transmitting a medium access control message including a logical channel identifier, where the logical channel identifier indicates the requested bitrate.

Some examples of the method, apparatuses, and non-transitory computer-readable medium described herein may further include operations, features, means, or instructions for transmitting, to the UE after receiving the requested bitrate, the bitrate recommendation, where the bitrate recommendation may be different than the requested bitrate.

In some examples of the method, apparatuses, and non-transitory computer-readable medium described herein, transmitting the bitrate recommendation may include operations, features, means, or instructions for transmitting a medium access control message including a logical channel identifier, where the logical channel identifier indicates the bitrate recommendation.

Some examples of the method, apparatuses, and non-transitory computer-readable medium described herein may further include operations, features, means, or instructions for transmitting, to the UE, an indication that the base station rejected the requested bitrate based on determining to reject the requested bitrate.

Some examples of the method, apparatuses, and non-transitory computer-readable medium described herein may further include operations, features, means, or instructions for refraining from transmitting a message to the UE indicating that the base station rejected the requested bitrate based on determining to reject the requested bitrate.

In some examples of the method, apparatuses, and non-transitory computer-readable medium described herein, receiving the requested bitrate may include operations, features, means, or instructions for receiving a medium access control message including a logical channel identifier, where the logical channel identifier indicates the requested bitrate.

In some examples of the method, apparatuses, and non-transitory computer-readable medium described herein, the requested bitrate includes an indication to increase a current bitrate or decrease the current bitrate being used for communications between the UE and the base station.

DETAILED DESCRIPTION

Figure 1:
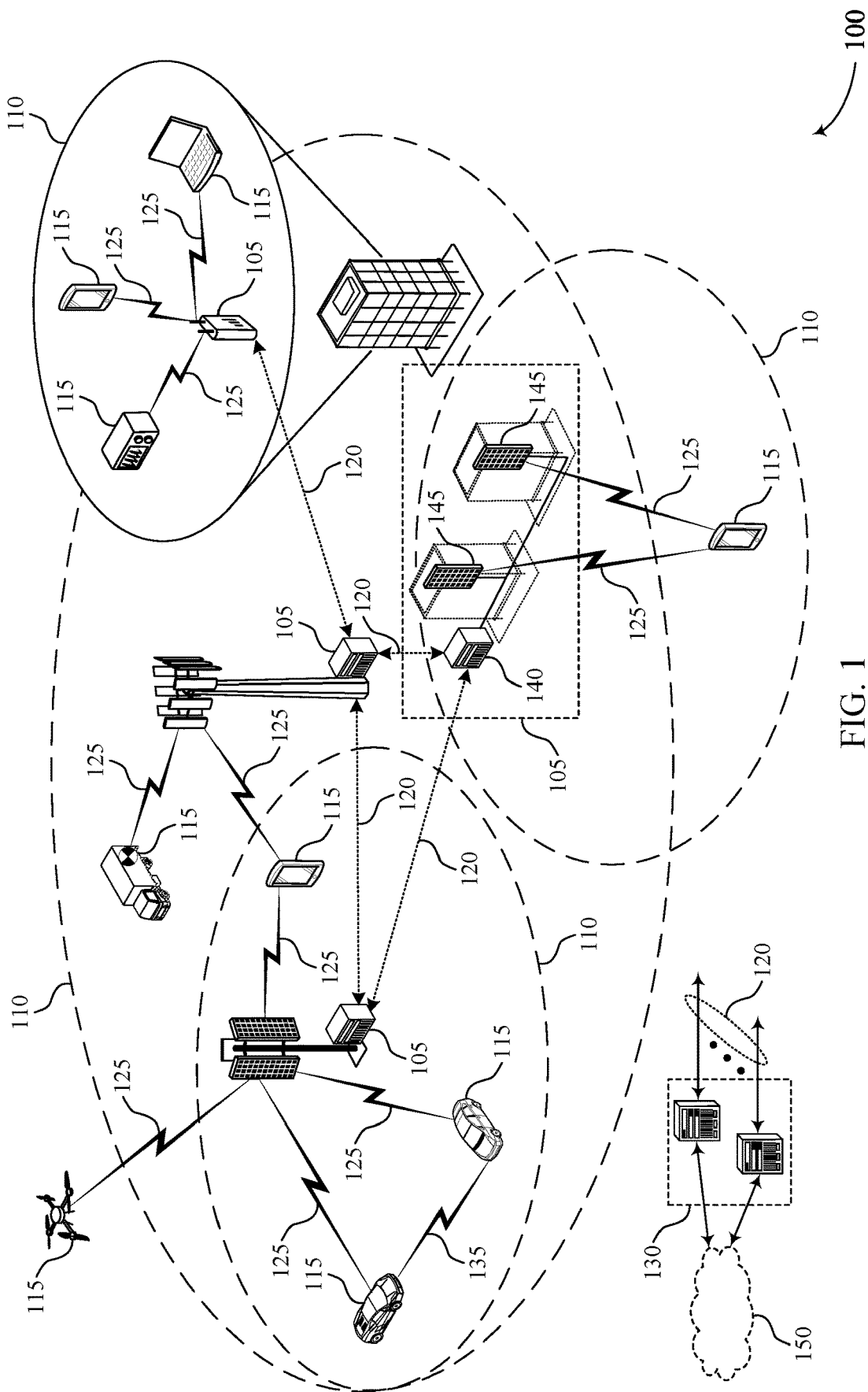
FIG. 1 illustrates an example of a wireless communications system that supports techniques for configuring a bitrate request in accordance with aspects of the present disclosure.

In some wireless communications systems, a user equipment (UE) may perform communications through a base station, such as a voice or video call, where the UE and base station may perform the call in accordance with a bitrate. In some cases, conditions may change that may impact the communications. In such cases, a base station may determine to change the bitrate being used for the call to improve or mitigate degradation of the call. Upon determining a change of bitrate, the base station may transmit a bitrate recommendation to the UE. Accordingly, the UE may receive the bitrate recommendation, and the UE may change the bitrate being used for the call in accordance with the recommendation. In some cases, the UE, the base station, or both may start a timer based on part receiving the bitrate recommendation. Upon expiry of the timer, the UE may transmit a request (e.g., query) to the base station requesting whether the UE is to continue using the last recommended bitrate, or the UE may request to use a different bitrate. In some cases, the UE may be configured to only transmit the bitrate request based on expiry of the timer which may only be prompted by the bitrate recommendation from the base station. Accordingly, the UE may be limited by the base station sending the bitrate recommendation. Accordingly, the bitrate recommendation may not be based on any request from the UE and the UE may be limited in opportunity to transmit the bitrate request.

To improve reliability and flexibility of a bitrate adjustment procedure, a UE may be configured to transmit a bitrate request regardless of the timer and bitrate recommendation. Therefore, a UE may calculate one or more parameters associated with a channel between the UE and the base station during a call (e.g., the channel associated with performing the call). Based on the one or more parameters (e.g., jitter, reference signal received quality (RSRQ), signal-to-interference-plus-noise ratio (SINR), delay) the UE may determine whether the bitrate being used for the call should be adjusted (e.g., to improve or maintain quality of the call). If the UE determines that the bitrate should be adjusted, then the UE may transmit a bitrate request to the base station (prior to ever receiving a bitrate recommendation from the base station, and accordingly, prior to the start or the expiry of the timer). The base station may consider the requested bitrate. In some cases, the base station may accept the requested bitrate or decline the requested bitrate. The base station may transmit a bitrate recommendation to the UE, where the recommended bitrate may by the same or different from the requested bitrate. Accordingly, the base station may determine the recommended bitrate based on information from the UE to improve the reliability of the call.

Particular aspects of the subject matter described herein may be implemented to realize one or more advantages. The described techniques may support improvements in updating a bitrate being used for communications between a UE and base station by improving flexibility of a bitrate adjustment procedure. Improving the flexibility of the bitrate adjusted procedure may improve reliability and decrease latency associated with the communications, among other advantages. As such, supported techniques may include improved network operations and, in some examples, may promote network efficiencies, among other benefits.

Aspects of the disclosure are initially described in the context of wireless communications systems. Aspects are the described with reference to Aspects of the disclosure are further illustrated by and described with reference to apparatus diagrams, system diagrams, and flowcharts that relate to techniques for configuring a bitrate request.

FIG. 1 illustrates an example of a wireless communications system 100 that supports techniques for configuring a bitrate request in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming.

The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A UE 115 may calculate one or more parameters (e.g., jitter, RSRQ, a SINR, delay, or a combination thereof) associated with a quality of communications between the UE 115 and a base station 105. The UE 115 may determine a bitrate for performing the communications based on the one or more calculated parameters prior to receiving a bitrate recommendation from the base station 105, and the UE 115 may transmit, prior to receiving the bitrate recommendation from the base station 105, a request to perform the communications in accordance with the determined bitrate. The base station 105 may determine whether to accept the requested bitrate, and perform the communications with the UE 115 in accordance with the determination.

Figure 2:
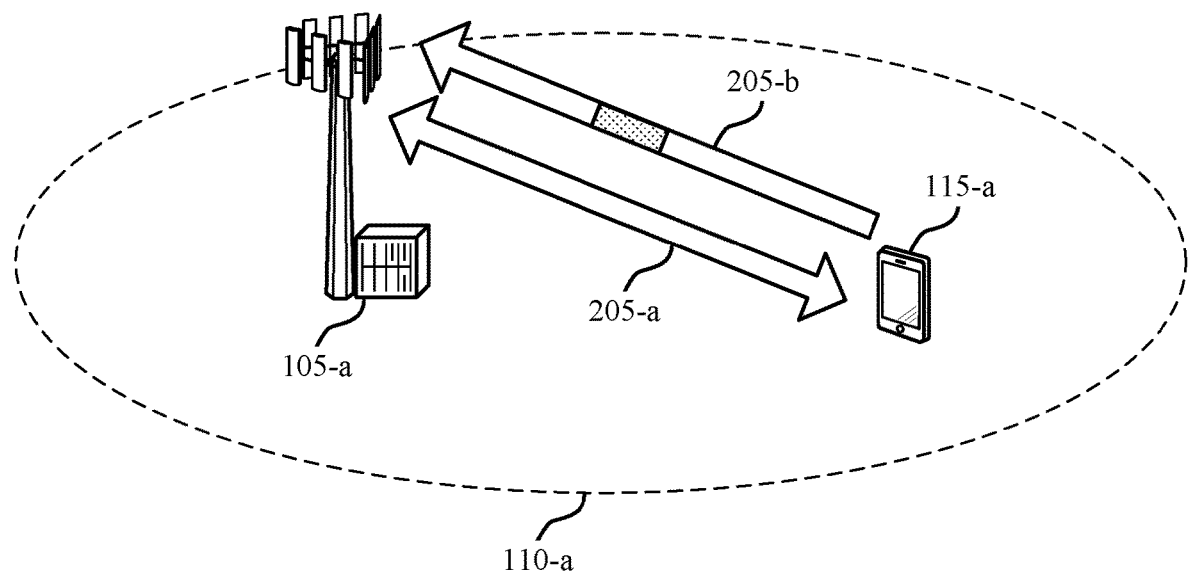
FIG. 2 illustrates an example of a wireless communications system that supports techniques for configuring a bitrate request in accordance with aspects of the present disclosure.
Figure 2:

FIG. 2 illustrates an example of a wireless communications system 200 that supports techniques for configuring a bitrate request in accordance with aspects of the present disclosure. The wireless communications system 200 may include base station 105-a and UE 115-a, which may be examples of a base station 105 and a UE 115 as described with reference to FIG. 1. Base station 105-a may serve a geographic coverage area 110-a. In some cases, base station 105-a and UE 115-a may implement a bitrate adjustment procedure for communications between UE 115-a and base station 105-a. Additionally or alternatively, other wireless devices, may implement a same or similar procedure.

A UE 115, such as UE 115-a, may perform communications via a base station 105, such as base station 105-a. In some cases, UE 115-a may perform a voice call, or video call, or both (e.g., an multimedia telephony service (MMTel) call with voice and/or video), via base station 105-a. For example, UE 115-a and base station 105-a may communicate in accordance with a call via communications link 205-a (e.g., an uplink communications and/or a downlink communications link). To perform the voice and/or video call, the base station 105 may recommend, to the UE 115, a bitrate to use to perform the call, where the recommendation may be based on channel conditions (e.g., wireless channel conditions). For example, base station 105-a may detect a radio link condition between UE 115-a and base station 105-a and may transmit a bit rate recommendation to UE 115-a. In some cases, the recommended bitrate may be directional such that the recommend bitrate is for uplink communications, downlink communications, or both. Accordingly, the base station 105 may recommend multiple different bitrates, such as one for use in the uplink and one for use in the downlink. In some cases, base station 105-a may send the bitrate recommendation message to UE 115-a based on UE 115-a supporting reception of the bitrate recommendation message. The base station 105 may be configured to transmit a higher allowed bit rate to the UE 115 when the radio link condition between the UE 115 and base station 105 is above a threshold (e.g., is good) in a specific direction and may be configured to transmit a lower allowed bit rate to the UE 115 when the radio link condition in a specific direction is degrading (e.g., getting worse).

In some cases, the base station 105 may include the recommend bitrate in a message, such as a medium access control (MAC) control element (MAC-CE) message. In some cases, the UE 115, the base station 105, or both may be configured with a bitrate map that indicates an association of bitrates to index values. In some cases, the index value may be a logical channel identifier (LCID) value included in an a MAC-CE (e.g., a MAC-CE sub-header). For example, the base station 105 may indicate the recommended bitrate as a set of bits in the LCID field of a MAC-CE. Accordingly, upon determining a recommended bitrate, the base station 105 may include an index value in the message that maps to the corresponding recommended bit rate.

The recommended bitrate may be a physical layer bit rate including the payload (e.g., the actual media such as audio and/or video traffic payload), and overhead (e.g., RTP, UDP, IP, and modem higher layer PDCP, RLC, MAC overheads). When the UE 115 receives a recommended bitrate (e.g., a radio access network (RAN) message), the UE 115 may save recommended bitrate information (e.g., save the uplink and/or downlink physical bitrate information as "RAN context"). For example, in the audio call scenario (e.g., audio codec in Voice over LTE (VoLTE) and/or Voice over NR (VoNR) voice call scenario), the UE 115 may use a selected mode and bitrate (e.g., Adaptive Multi-Rate Wideband (AMR-WB) 23.85 kbit/s, Enhanced Voice Services (EVS) 24.4 kbit/s etc.). The UE 115 may then adapt the selected mode and bitrate (e.g., the audio codec mode and bitrate) according to the saved bitrate information (e.g., the RAN context) to improve the call quality as recommended by the base station 105 for better user experience. The UE 115 may perform a similar procedure for video calls (e.g., video streaming).

In some implementations, a UE 115 may be capable of transmitting a bitrate request (e.g., query) to the base station 105 to increase or decrease the previously received recommended bitrate (e.g., in the uplink, downlink, or both). Similarly to the recommend bitrate, in some cases, the UE 115 may include the bitrate request in a message, such as a MAC-CE message. In some cases, the UE 115, the base station 105, or both may be configured with a bitrate map that indicates an association of bitrates to index values. In some cases, the index value may be a LCID value included in an a MAC-CE (e.g., a MAC-CE sub-header). For example, the UE 115 may indicate the requested bitrate as a set of bits in the LCID field of a MAC-CE. Accordingly, upon determining a requested bitrate, the UE 115 may include an index value in the message that maps to the corresponding recommended bit rate.

Accordingly, a base station 105 may determine a recommended bitrate for a UE 115 to use for communications between the UE 115 and base station 105. The base station 105 may transmit a message (e.g., a MAC-CE) including an indication of a recommended bitrate (e.g., LCID, a direction field (indicating uplink or downlink), a bitrate index). In some cases, the MAC layer (e.g., MAC layer 2) of the UE 115 may receive the bitrate recommendation and the MAC layer may relay the bitrate recommendation to a data services (DS) of the UE 115 (e.g., via a BitRate_MAC message including an evolved packet system (EPS) bearer ID, direction field, bitrate index, robust header compression (RoHC) engage/disengage information). The DS may be referred to as an intermediate layer of the UE 115. The DS of the UE 115 may relay the bitrate recommendation to the IMS of the UE 115 (e.g., via a BitRate_DS message including media ID, direction field, bitrate index, RoHC engage/disengage information), where the IMS processes the bitrate to be used for the call. In some cases, the bitrate may be relayed to an upper layer of the UE or to the IMS directly.

Upon receiving the recommended bitrate, the UE 115 may be configured to start a timer (e.g., bitRateQueryProhibit-Timer), where the timer may define a duration the UE 115 is to wait before transmitting a bitrate request. In some cases, the UE 115 may start the timer when the recommended bitrate is received by the IMS of the UE 115. The UE 115 may be configured to refrain from transmitting a bitrate request to the base station 105 until the timer expires. Accordingly, if the UE 115 determines that the bitrate should be increased or decreased from the recommended bitrate, then the IMS of the UE 115 may transmit a bitrate request to the DS of the UE 115 (e.g., via a BitRAteQ_IMS message including a media ID, direction field, and bitrate index). The DS may relay the bitrate request to the MAC layer of the UE 115 (e.g., (e.g., via a BitRAteQ_DS message including an EPS bearer ID, direction field, and bitrate index). Upon receiving the bitrate request, the MAC layer may determine whether to transmit the bitrate request to the base station 105 based on whether the timer is running. If the timer is still running, the MAC layer may refrain from transmitting the bitrate request to the base station 105. If, however, the timer has expired, then the MAC layer may transmit the bitrate request to the base station 105 (e.g., via a MAC-CE message including an LCID, direction field, and bitrate index). The bitrate request may query whether the UE 115 is to continue using the last recommended bitrate, or the UE 115 may request to use a different bitrate. The bitrate request may indicate for the base station 105 to increase or decrease the bitrate from the last recommended bitrate and may include an indication of a direction (e.g., uplink, downlink, or both) for which the bitrate request applies. For example, the UE 115 may request for the bitrate to increase or decrease in the uplink, or the downlink, or both.

However, the UE 115 may be configured to only transmit the bitrate request based on expiry of the timer which may only be prompted by the bitrate recommendation from the base station 105. Accordingly, the UE 115 may be limited in transmitting the bitrate request by the base station 105 sending the bitrate recommendation. As such, the bitrate recommendation may not be based on any request from the UE 115 and the UE 115 may be limited in opportunity to transmit the bitrate request.

To improve reliability and flexibility of a bitrate adjustment procedure, a UE 115 may be configured to transmit a bitrate request regardless of the timer (e.g., bitRateQuery-ProhibitTimer), and bitrate recommendation. Rather, a UE 115 may determine a quality of communications between the UE 115 and a base station and if the UE 115 determines to increase or decrease the bitrate, then the UE 115 may transmit a bitrate request to the base station 105 regardless of whether the UE 115 has received a bitrate recommendation or whether the timer is running. Accordingly, UE 115-*a* may be performing a call via base station 105-*a* over communications link 205-*a*. UE 115-*a* may calculate one or more parameters (e.g., jitter, reference signal received quality (RSRQ), signal-to-interference-plus-noise ratio (SINR), delay) associated with a channel (e.g., communications link 205-*a*) between UE 115-*a* and base station 105-*a* during a call. UE 115-*a* may be configured to calculate the one or more parameters in the IMS stack during the call. UE 115-*a* may be configured to perform the calculations periodically or continuously while UE 115-*a* is performing the call. UE 115-*a* may calculate the parameters before or after receiving a bitrate recommendation from base station 105-*a*. In some cases, UE 115-*a* may be preconfigured with a calculation configuration (e.g., parameters to calculate, frequency of calculation), or UE 115-*a* may receive the calculation configuration in a message (e.g., radio resource control (RRC), MAC-CE, downlink control information (DCI)) from a network device, such as base station 105-*a*.

Based on the one or more parameters UE 115-*a* may determine whether the bitrate being used for the call should be adjusted by increasing, or decreasing the current bitrate (e.g., to improve or maintain quality of the call). If UE 115-*a* determines that the bitrate should be adjusted, then UE 115-*a* may transmit a bitrate request 210 to base station 150-*a* via communications link 205-*b*. For example, UE 115-*a* may transmit (e.g., the MAC layer may transmit) the bitrate request 210 to the base station 105 prior to ever receiving a bitrate recommendation from base station 105-*a*, and accordingly, prior to the start and/or expiry of the timer. The bitrate request 210 may include indicate a specific bitrate, or an indication to increase or decrease the bitrate from the current bitrate. In some cases, UE 115-*a* may request a directional bitrate. For example, the UE 115 may request multiple different bitrates, such as one for use in the uplink and one for use in the downlink.

Base station 105-*a* may consider the requested bitrate. In some cases, base station 105-*a* may accept the requested bitrate or decline the requested bitrate. If base station 105-*a* accepts the bitrate request 210, base station 105-*a* may transmit a message to UE 115-*a* indicating that base station 105-*a* accepts the request. Additionally or alternatively, if base station 105-*a* accepts the bitrate request, base station 105-*a* may transmit a bitrate recommendation to UE 115-*a*, where the bitrate recommendation may indicate a recommended bitrate equal to the requested bitrate.

If base station 105-*a* rejects the bitrate request 210, base station 105-*a* may transmit a message to UE 115-*a* indicating that base station 105-*a* rejects the request. Additionally or alternatively, if base station 105-*a* rejects the bitrate request, base station 105-*a* may refrain from transmitting a response to the bitrate request 210. Additionally or alternatively, if base station 105-*a* rejects the bitrate request, base station 105-*a* may transmit a bitrate recommendation to UE 115-*a*, where the bitrate recommendation may indicate a recommended bitrate different from the requested bitrate. Accordingly, base station 105-*a* may determine the recommended bitrate based on information from UE 115-*a* to improve the reliability of the call.

UE 115-*a* may be pre-configured to transmit bitrate request 210 regardless of a bitrate recommendation, or may receive a message (e.g., RRC, DCI, MAC-CE) from the base station 105 indicating the UE 115 to operate in such a manner. In some cases, upon transmitting a bitrate request, UE 115-*a* may be configured to start a bitrate request timer, where the bitrate request timer may define a duration for UE 115-*a* to wait before transmitting a second bitrate request. The bitrate request timer may be different from the bitRateQueryProhibitTimer, and may expire after a duration or based on an event, such as UE 115-*a* receiving a bitrate recommendation. For example, UE 115-*a* may start a bitrate request timer upon transmitting the bitrate request 210, and refrain from transmitting a second request while the bitrate request timer is running. If the bitrate does not change while the timer is running (e.g., UE 115-*a* does not receive a bitrate recommendation), UE 115-*b* may determine to request the same or a different bitrate (compared to the previously transmitted bitrate request). Upon expiry of the bitrate request timer, UE 115-*b* may transmit the second bitrate request to perform the communications in accordance with the determined bitrate.

UE 115-*a* may be pre-configured with the bitrate request timer, or may receive a message (e.g., RRC, DCI, MAC-CE) from the base station 105 indicating UE 115-*a* to use the bitrate request timer and the parameters associated with the bitrate request timer (e.g., when to start the timer, the duration of the timer, what to do after expiry of the timer).

Figure 3:
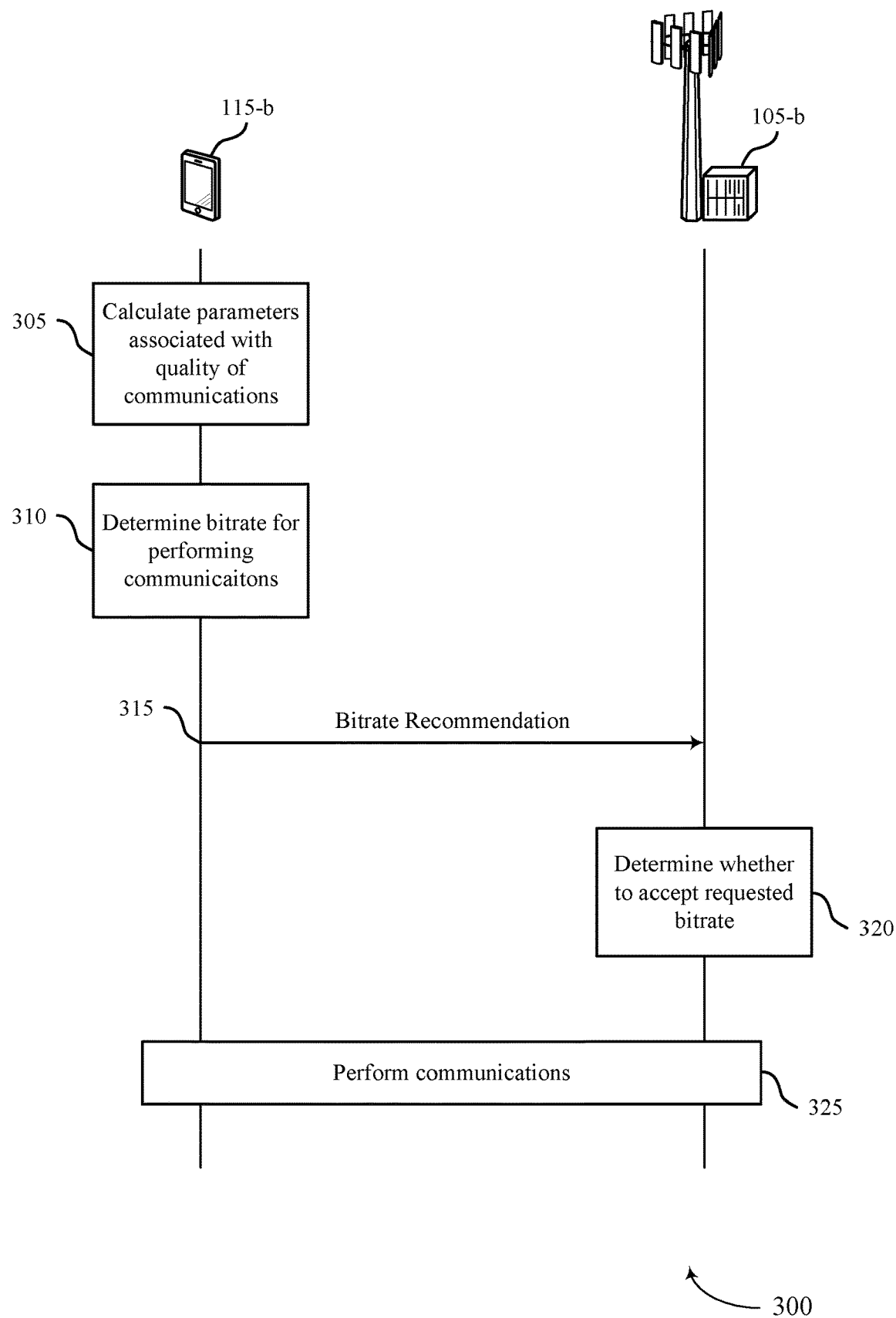
FIG. 3 illustrates an example of a process flow that supports techniques for configuring a bitrate request in accordance with aspects of the present disclosure.

FIG. 3 illustrates an example of a process flow 300 that supports techniques for configuring a bitrate request in accordance with aspects of the present disclosure. The process flow 300 may illustrate an example bitrate adjustment procedure. For example, UE 115-*b* may determine to increase or decrease a bitrate being used for communications between UE 115-*b* and base station 105-*b* and UE 115-*b* may transmit a bitrate request to base station 105-*b*. Base station 105-*b* and UE 115-*b* may be examples of the corresponding wireless devices described with reference to FIGS. 1 and 2. In some cases, instead of UE 115-*b* implementing the bitrate adjustment procedure, a different type of device (e.g., a base station 105) may perform a same of similar procedure. Alternative examples of the following may be implemented, where some steps are performed in a different order than described or are not performed at all. In some cases, steps may include additional features not mentioned below, or further steps may be added.

At 305, UE 115-*b* may calculate one or more parameters associated with a quality of communications between UE 115-*b* and base station 105-*b*. Calculating one or more parameters may include calculating a jitter, a delay, a reference signal received quality, a signal-to-interference-plus-noise ratio, or a combination thereof associated with communications between UE 115-*b* and base station 105-*b*.

At 310, UE 115-*b* may determine a bitrate for performing the communications based on the one or more calculated parameters prior to receiving a bitrate recommendation from base station 105-*b*.

At 315, UE 115-*b* may transmit, prior to receiving the bitrate recommendation from base station 105-*b*, a request to perform the communications in accordance with the determined bitrate. The request may include an indication to increase a current bitrate or decrease the current bitrate being used for communications between UE 115-*b* and base station 105-*b*. Transmitting the request may include transmitting a medium access control message including a logical channel identifier, where the logical channel identifier may indicate the request.

In some cases, UE 115-*b* may start a bitrate request timer upon transmitting the request, and refrain from transmitting a second request while the bitrate request timer is running. UE 115-*b* may identify that the bitrate request timer has expired, and may transmit the second request to perform the communications in accordance with the determined bitrate.

At 320, base station 105-*b* may determine whether to accept the requested bitrate. In some cases, UE 115-*b* may receive, from base station 105-*b*, an indication of an acceptance by base station 105-*b* to use the determined bitrate. Receiving the indication of the acceptance may include receiving the bitrate recommendation after transmitting the request, where the bitrate recommendation may include the determined bitrate. Receiving the bitrate recommendation may include receiving a medium access control message including a logical channel identifier, where the logical channel identifier indicates the determined bitrate.

In some cases, UE 115-*b* may receive, from base station 105-*b* after transmitting the request, the bitrate recommendation, where the bitrate recommendation may be different than the determined bitrate. Receiving the bitrate recommendation may include receiving a medium access control message including a logical channel identifier, where the logical channel identifier may indicate the bitrate recommendation. In some implementations, UE 115-*b* may receive, from base station 105-*b*, an indication that base station 105-*b* rejected the determined bitrate.

In some cases, base station 105-*b* may refrain from transmitting a message to UE 115-*b* indicating that base station 105-*b* rejected the requested bitrate based on determining to reject the requested bitrate. UE 115-*b* may identify a failure by UE 115-*b* to receive an indication that base station 105-*b* accepts the determined bitrate, and UE 115-*b* may refrain from switching bitrates to the determined bitrate based on the identification.

At 325, UE 115-*b* and base station 105-*b* may perform communications (e.g., voice call, video call) in accordance with the determination.

Figure 4:
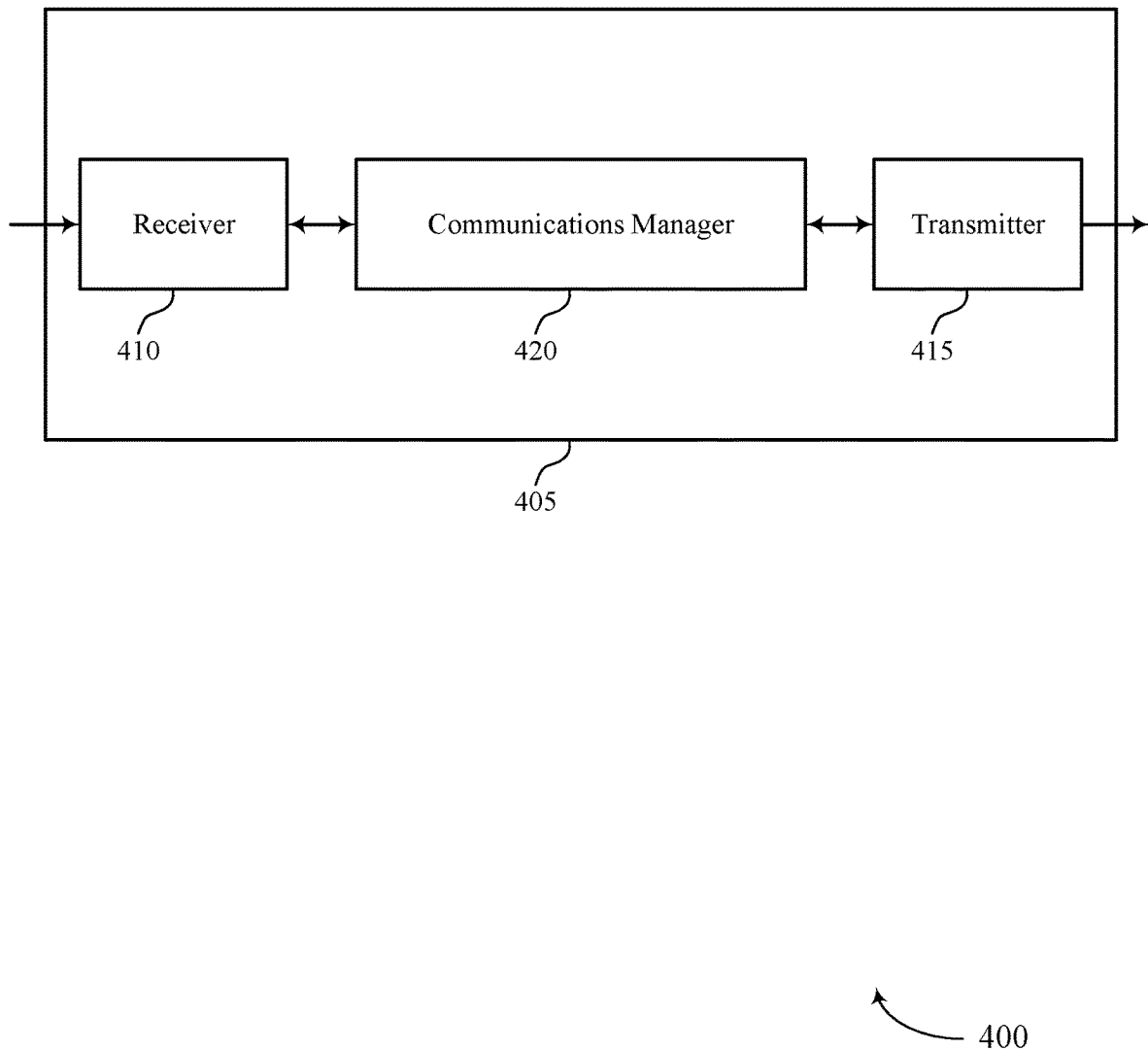
FIGS. 4 and 5 show block diagrams of devices that support techniques for configuring a bitrate request in accordance with aspects of the present disclosure.

FIG. 4 shows a block diagram 400 of a device 405 that supports techniques for configuring a bitrate request in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for configuring a bitrate request). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for configuring a bitrate request). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for configuring a bitrate request as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a UE in accordance with examples as disclosed herein. For example, the communications manager 420 may be configured as or otherwise support a means for calculating one or more parameters associated with a quality of communications between the UE and a base station. The communications manager 420 may be configured as or otherwise support a means for determining a bitrate for performing the communications based on the one or more calculated parameters prior to receiving a bitrate recommendation from the base station. The communications manager 420 may be configured as or otherwise support a means for transmitting, prior to receiving the bitrate recommendation from the base station, a request to perform the communications in accordance with the determined bitrate.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for more efficient utilization of communication resources.

Figure 5:
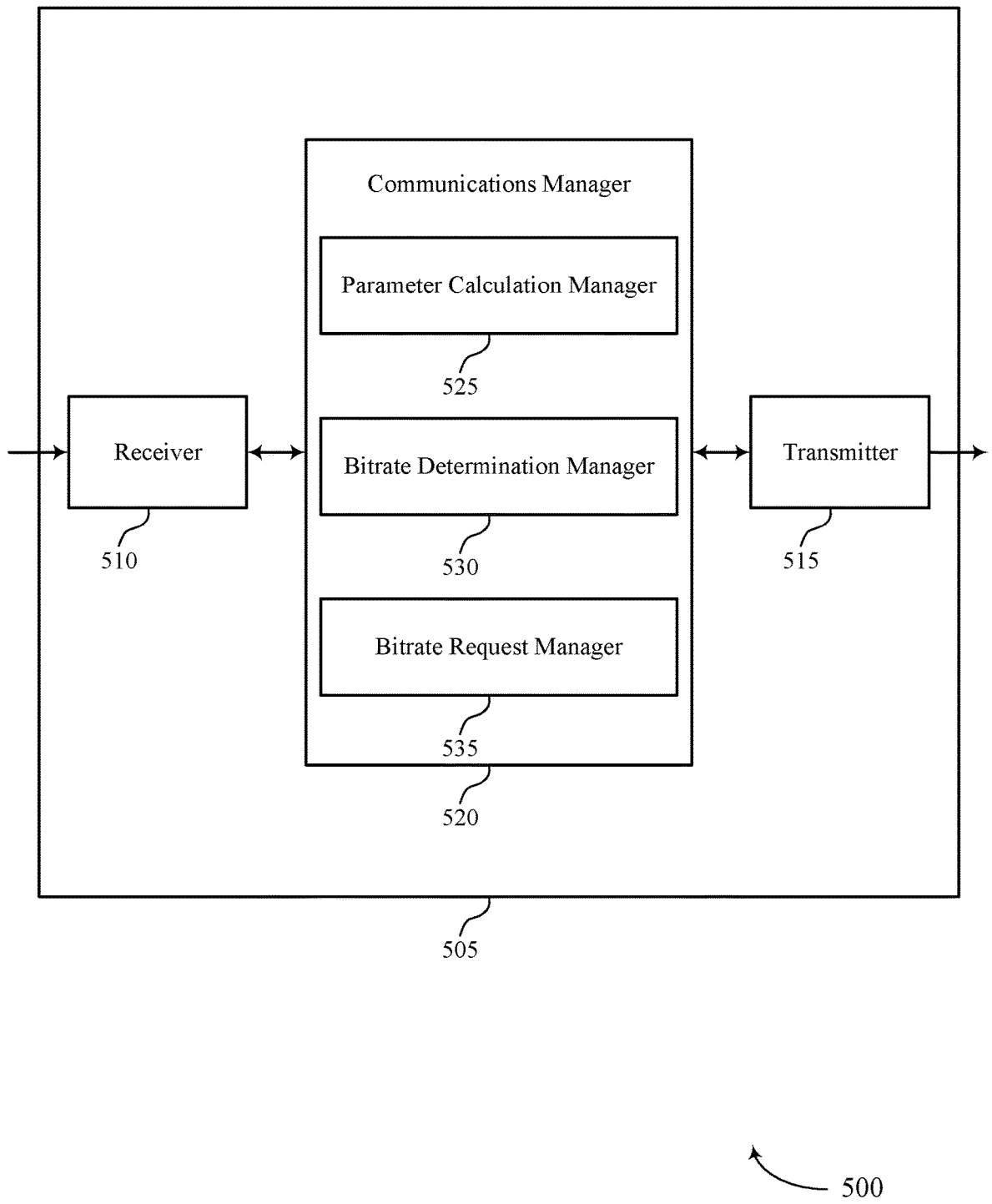

FIG. 5 shows a block diagram 500 of a device 505 that supports techniques for configuring a bitrate request in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for configuring a bitrate request). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for configuring a bitrate request). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for configuring a bitrate request as described herein. For example, the communications manager 520 may include a parameter calculation manager 525, a bitrate determination manager 530, a bitrate request manager 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. The parameter calculation manager 525 may be configured as or otherwise support a means for calculating one or more parameters associated with a quality of communications between the UE and a base station. The bitrate determination manager 530 may be configured as or otherwise support a means for determining a bitrate for performing the communications based on the one or more calculated parameters prior to receiving a bitrate recommendation from the base station. The bitrate request manager 535 may be configured as or otherwise support a means for transmitting, prior to receiving the bitrate recommendation from the base station, a request to perform the communications in accordance with the determined bitrate.

Figure 6:
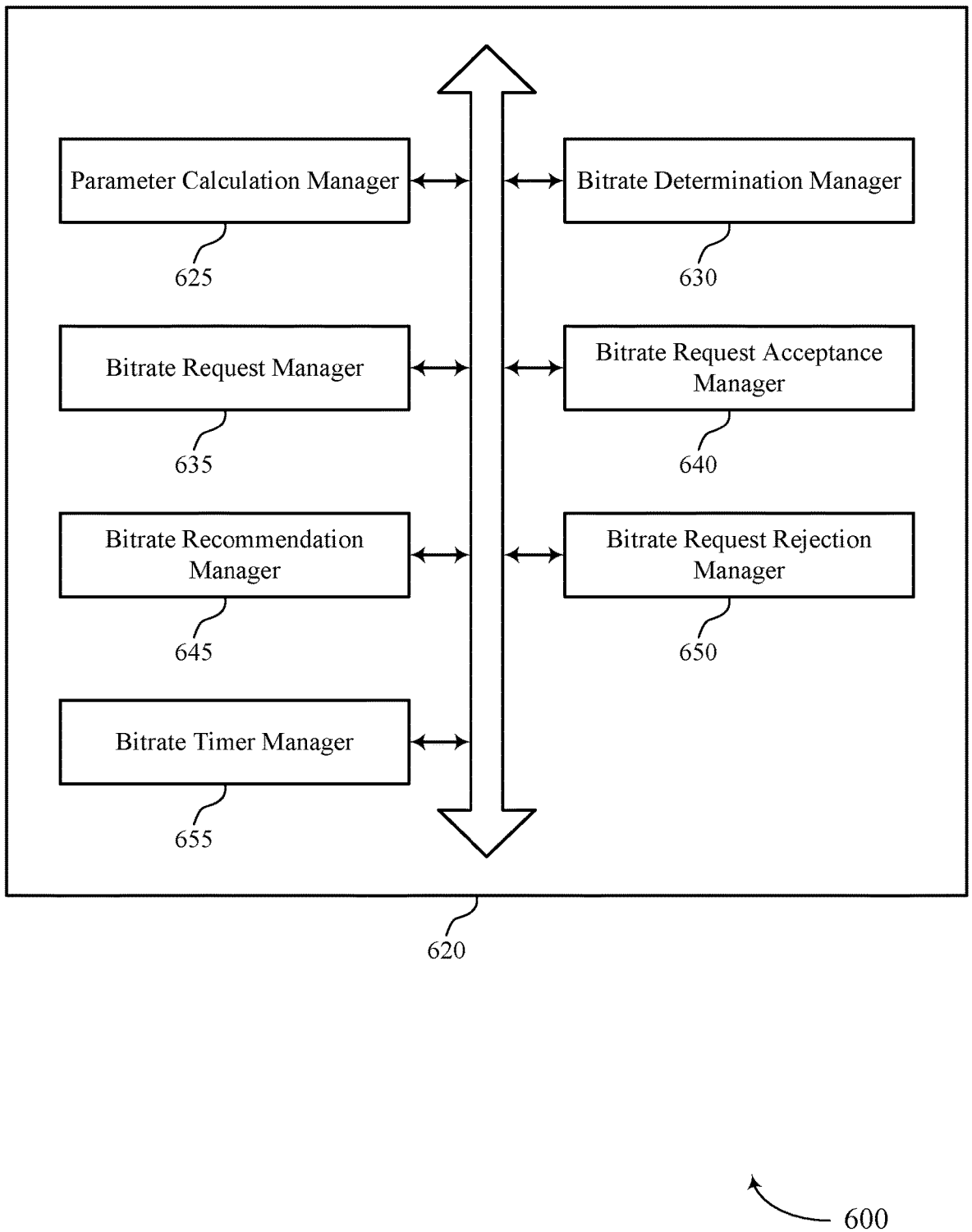
FIG. 6 shows a block diagram of a communications manager that supports techniques for configuring a bitrate request in accordance with aspects of the present disclosure.

FIG. 6 shows a block diagram 600 of a communications manager 620 that supports techniques for configuring a bitrate request in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for configuring a bitrate request as described herein. For example, the communications manager 620 may include a parameter calculation manager 625, a bitrate determination manager 630, a bitrate request manager 635, a bitrate request acceptance manager 640, a bitrate recommendation manager 645, a bitrate request rejection manager 650, a bitrate timer manager 655, or any combination thereof. Each of these components may communicate, directly or indirectly, with one another (e.g., via one or more buses).

The communications manager 620 may support wireless communications at a UE in accordance with examples as disclosed herein. The parameter calculation manager 625 may be configured as or otherwise support a means for calculating one or more parameters associated with a quality of communications between the UE and a base station. The bitrate determination manager 630 may be configured as or otherwise support a means for determining a bitrate for performing the communications based on the one or more calculated parameters prior to receiving a bitrate recommendation from the base station. The bitrate request manager 635 may be configured as or otherwise support a means for transmitting, prior to receiving the bitrate recommendation from the base station, a request to perform the communications in accordance with the determined bitrate.

In some examples, the bitrate request acceptance manager 640 may be configured as or otherwise support a means for receiving, from the base station, an indication of an acceptance by the base station to use the determined bitrate.

In some examples, to support receiving the indication of the acceptance, the bitrate recommendation manager 645 may be configured as or otherwise support a means for receiving the bitrate recommendation after transmitting the request, where the bitrate recommendation includes the determined bitrate.

In some examples, to support receiving the bitrate recommendation, the bitrate recommendation manager 645 may be configured as or otherwise support a means for receiving a medium access control message including a logical channel identifier, where the logical channel identifier indicates the determined bitrate.

In some examples, the bitrate recommendation manager 645 may be configured as or otherwise support a means for receiving, from the base station after transmitting the request, the bitrate recommendation, where the bitrate recommendation is different than the determined bitrate.

In some examples, to support receiving the bitrate recommendation, the bitrate recommendation manager 645 may be configured as or otherwise support a means for receiving a medium access control message including a logical channel identifier, where the logical channel identifier indicates the bitrate recommendation.

In some examples, the bitrate request rejection manager 650 may be configured as or otherwise support a means for receiving, from the base station, an indication that the base station rejected the determined bitrate.

In some examples, the bitrate request rejection manager 650 may be configured as or otherwise support a means for identifying a failure by the UE to receive an indication that the base station accepts the determined bitrate. In some examples, the bitrate request rejection manager 650 may be configured as or otherwise support a means for refraining from switching bitrates to the determined bitrate based on the identification.

In some examples, the bitrate timer manager 655 may be configured as or otherwise support a means for starting a bitrate request timer upon transmitting the request. In some examples, the bitrate request manager 635 may be configured as or otherwise support a means for refraining from transmitting a second request while the bitrate request timer is running.

In some examples, the bitrate timer manager 655 may be configured as or otherwise support a means for identifying that the bitrate request timer has expired. In some examples, the bitrate request manager 635 may be configured as or otherwise support a means for transmitting the second request to perform the communications in accordance with the determined bitrate.

In some examples, to support transmitting the request, the bitrate request manager 635 may be configured as or otherwise support a means for transmitting a medium access control message including a logical channel identifier, where the logical channel identifier indicates the request.

In some examples, to support calculating one or more parameters, the parameter calculation manager 625 may be configured as or otherwise support a means for calculating a jitter, a delay, a reference signal received quality, a signal-to-interference-plus-noise ratio, or a combination thereof associated with communications between the UE and the base station.

In some examples, the request includes an indication to increase a current bitrate or decrease the current bitrate being used for communications between the UE and the base station.

Figure 7:
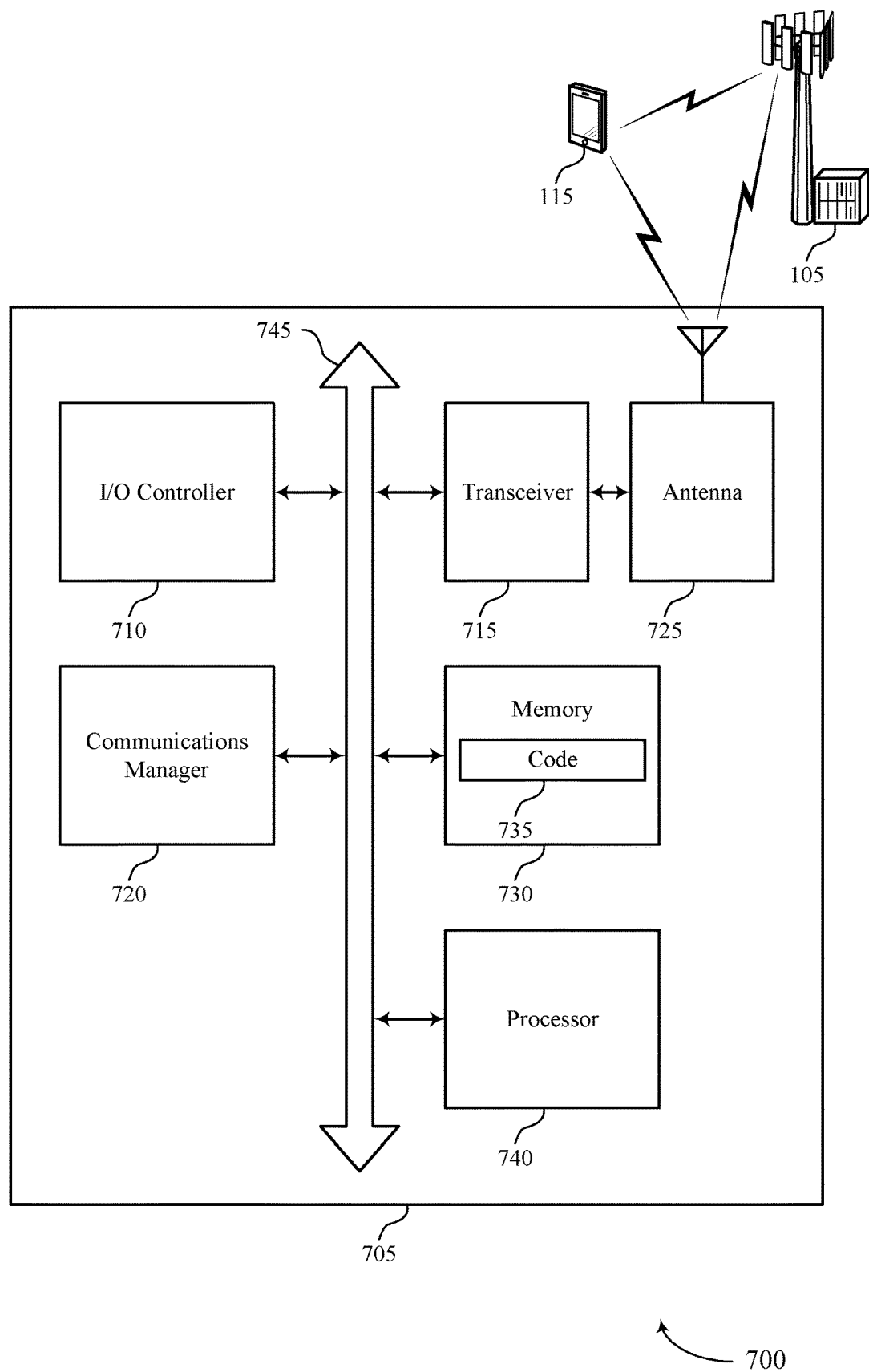
FIG. 7 shows a diagram of a system including a device that supports techniques for configuring a bitrate request in accordance with aspects of the present disclosure.

FIG. 7 shows a diagram of a system 700 including a device 705 that supports techniques for configuring a bitrate request in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for configuring a bitrate request). For example, the device 705 or a component of the device 705 may include a processor 740 and memory 730 coupled to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for calculating one or more parameters associated with a quality of communications between the UE and a base station. The communications manager 720 may be configured as or otherwise support a means for determining a bitrate for performing the communications based on the one or more calculated parameters prior to receiving a bitrate recommendation from the base station. The communications manager 720 may be configured as or otherwise support a means for transmitting, prior to receiving the bitrate recommendation from the base station, a request to perform the communications in accordance with the determined bitrate.

By including or configuring the communications manager 720 in accordance with examples as described herein, the device 705 may support techniques for improved communication reliability, reduced latency, more efficient utilization of communication resources, and improved coordination between devices.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for configuring a bitrate request as described herein, or the processor 740 and the memory 730 may be otherwise configured to perform or support such operations.

Figure 8:
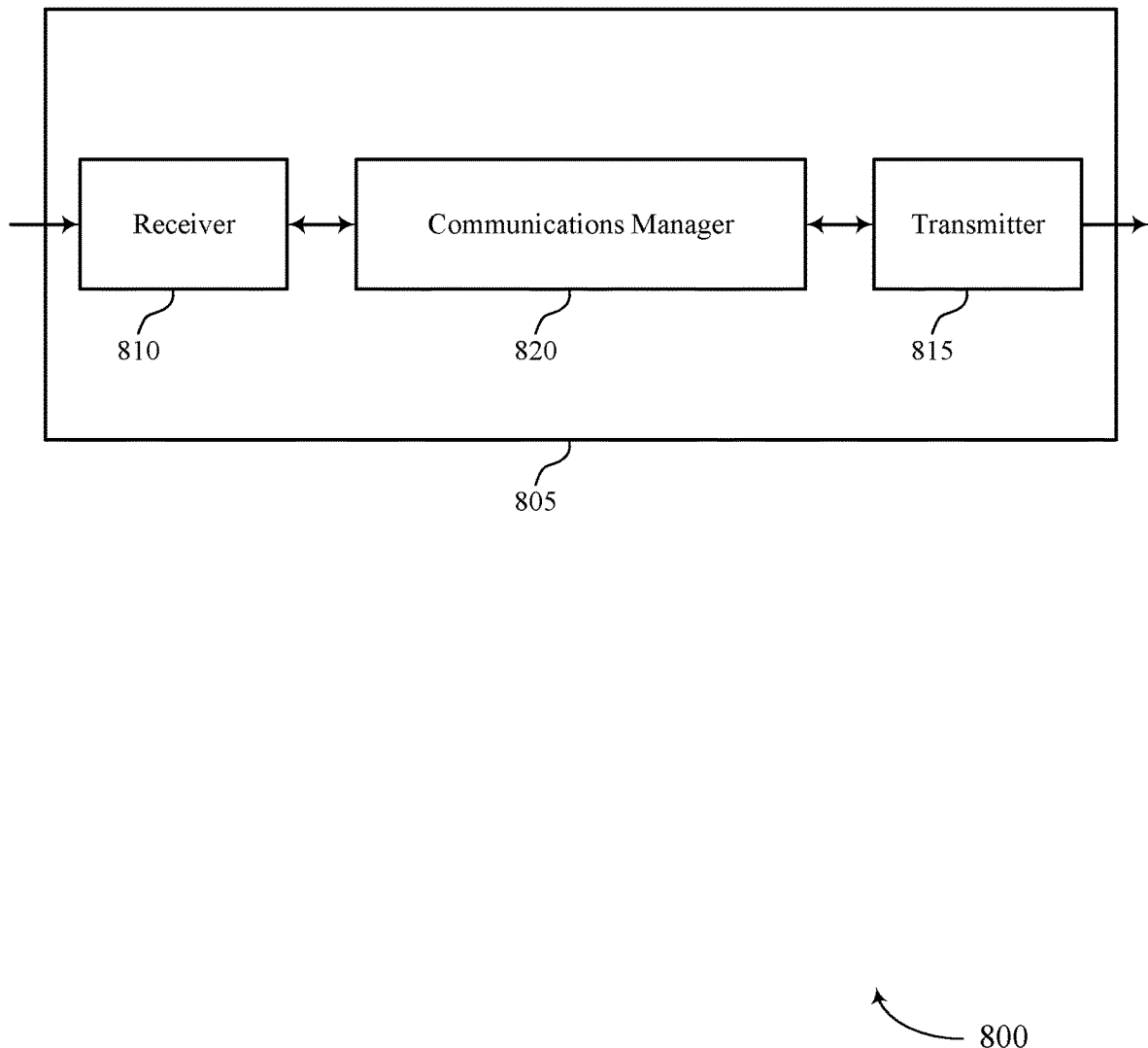
FIGS. 8 and 9 show block diagrams of devices that support techniques for configuring a bitrate request in accordance with aspects of the present disclosure.

FIG. 8 shows a block diagram 800 of a device 805 that supports techniques for configuring a bitrate request in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for configuring a bitrate request). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for configuring a bitrate request). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for configuring a bitrate request as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a base station in accordance with examples as disclosed herein. For example, the communications manager 820 may be configured as or otherwise support a means for receiving, from a UE, prior to transmitting a bitrate recommendation to the UE, a requested bitrate for communications between the UE and the base station. The communications manager 820 may be configured as or otherwise support a means for determining whether to accept the requested bitrate. The communications manager 820 may be configured as or otherwise support a means for performing the communications with the UE in accordance with the determination.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for more efficient utilization of communication resources.

Figure 9:
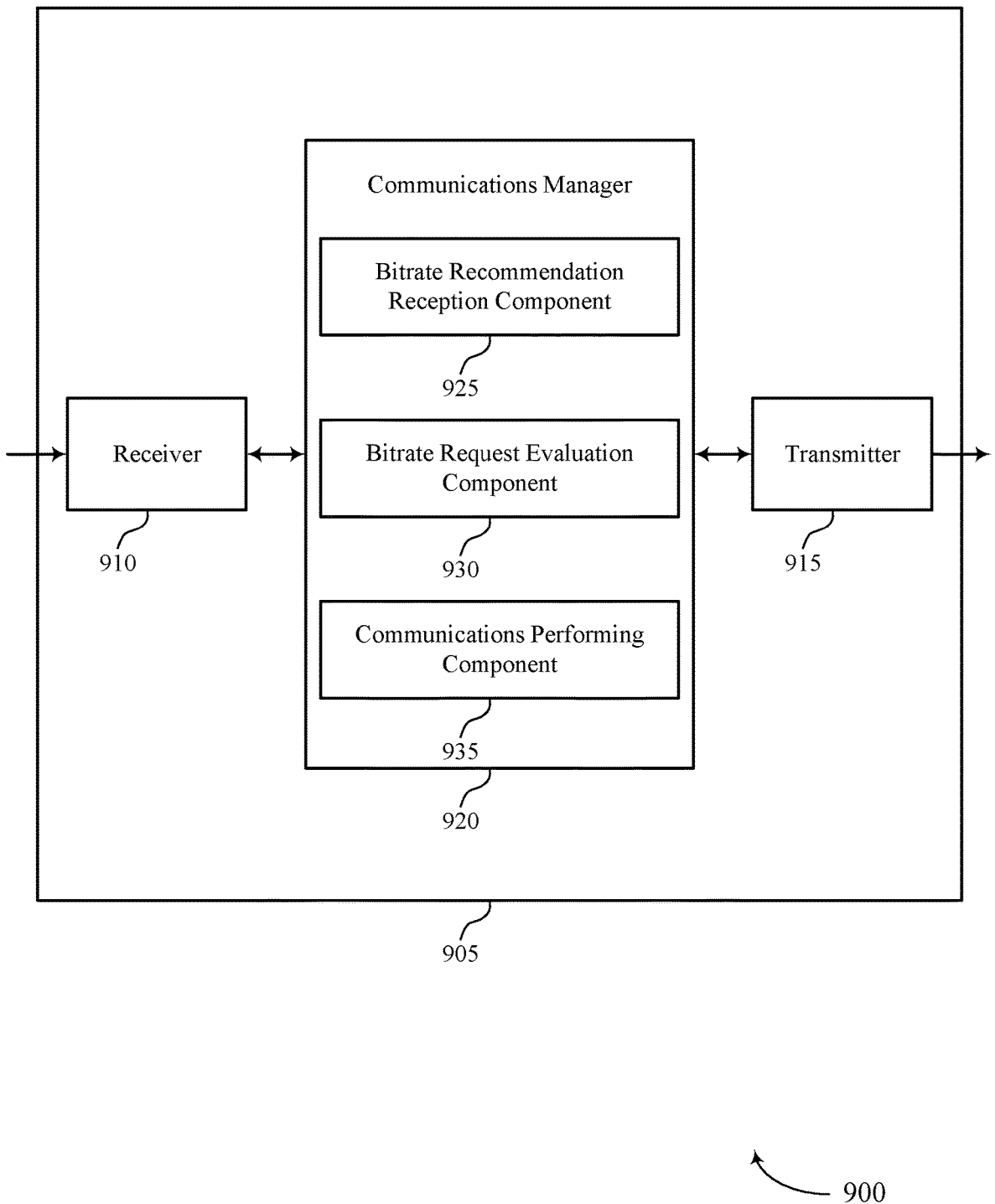

FIG. 9 shows a block diagram 900 of a device 905 that supports techniques for configuring a bitrate request in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for configuring a bitrate request). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for configuring a bitrate request). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for configuring a bitrate request as described herein. For example, the communications manager 920 may include a bitrate recommendation reception component 925, a bitrate request evaluation component 930, a communications performing component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. The bitrate recommendation reception component 925 may be configured as or otherwise support a means for receiving, from a UE, prior to transmitting a bitrate recommendation to the UE, a requested bitrate for communications between the UE and the base station. The bitrate request evaluation component 930 may be configured as or otherwise support a means for determining whether to accept the requested bitrate. The communications performing component 935 may be configured as or otherwise support a means for performing the communications with the UE in accordance with the determination.

Figure 10:
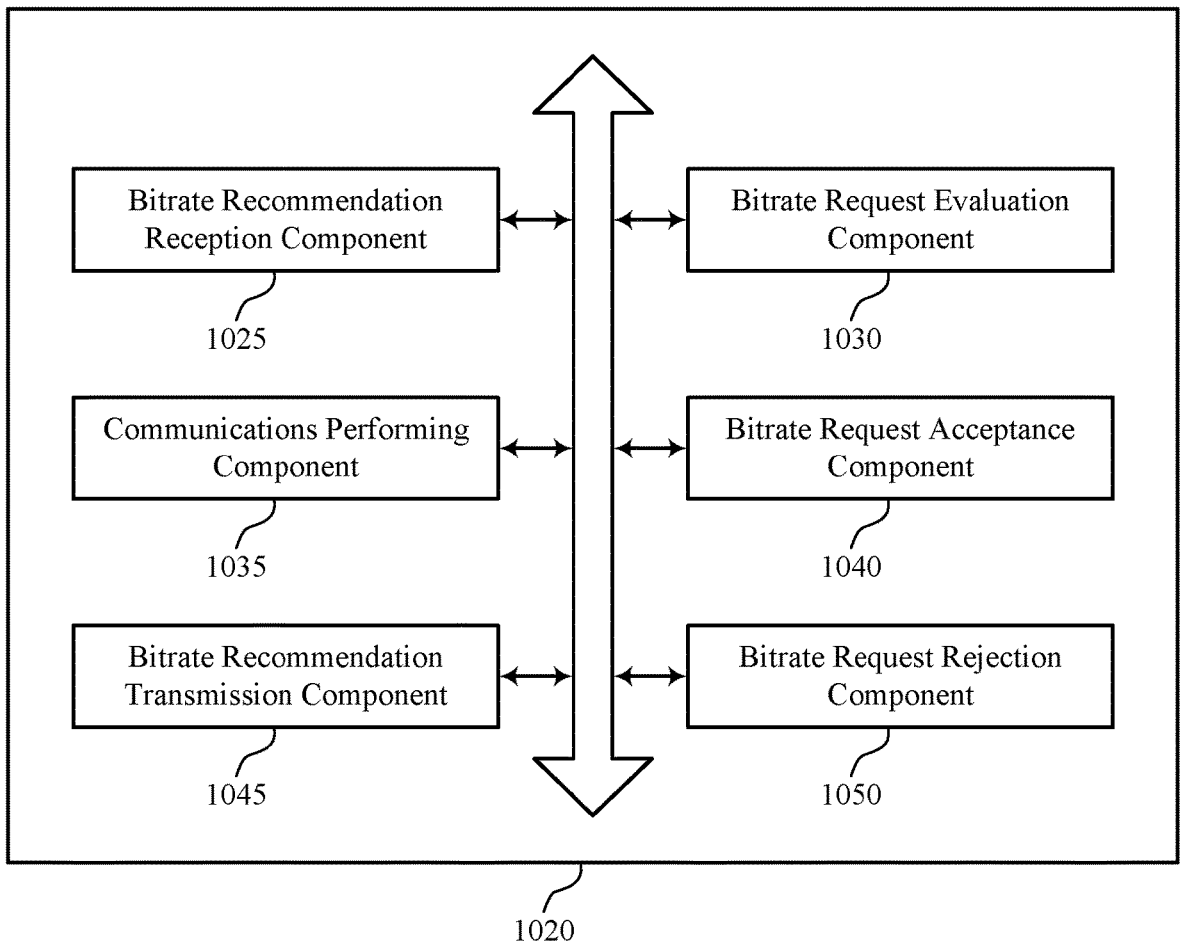
FIG. 10 shows a block diagram of a communications manager that supports techniques for configuring a bitrate request in accordance with aspects of the present disclosure.

FIG. 10 shows a block diagram 1000 of a communications manager 1020 that supports techniques for configuring a bitrate request in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for configuring a bitrate request as described herein. For example, the communications manager 1020 may include a bitrate recommendation reception component 1025, a bitrate request evaluation component 1030, a communications performing component 1035, a bitrate request acceptance component 1040, a bitrate recommendation transmission component 1045, a bitrate request rejection component 1050, or any combination thereof. Each of these components may communicate, directly or indirectly, with one another (e.g., via one or more buses).

The communications manager 1020 may support wireless communications at a base station in accordance with examples as disclosed herein. The bitrate recommendation reception component 1025 may be configured as or otherwise support a means for receiving, from a UE, prior to transmitting a bitrate recommendation to the UE, a requested bitrate for communications between the UE and the base station. The bitrate request evaluation component 1030 may be configured as or otherwise support a means for determining whether to accept the requested bitrate. The communications performing component 1035 may be configured as or otherwise support a means for performing the communications with the UE in accordance with the determination.

In some examples, the bitrate request acceptance component 1040 may be configured as or otherwise support a means for transmitting, to the UE, an indication of an acceptance by the base station to use the determined bitrate based on determining to accept the requested bitrate.

In some examples, to support transmitting the indication of the acceptance, the bitrate recommendation transmission component 1045 may be configured as or otherwise support a means for transmitting the bitrate recommendation after receiving the requested bitrate, where the bitrate recommendation includes the requested bitrate.

In some examples, to support transmitting the bitrate recommendation, the bitrate recommendation transmission component 1045 may be configured as or otherwise support a means for transmitting a medium access control message including a logical channel identifier, where the logical channel identifier indicates the requested bitrate.

In some examples, the bitrate recommendation transmission component 1045 may be configured as or otherwise support a means for transmitting, to the UE after receiving the requested bitrate, the bitrate recommendation, where the bitrate recommendation is different than the requested bitrate.

In some examples, to support transmitting the bitrate recommendation, the bitrate recommendation transmission component 1045 may be configured as or otherwise support a means for transmitting a medium access control message including a logical channel identifier, where the logical channel identifier indicates the bitrate recommendation.

In some examples, the bitrate request rejection component 1050 may be configured as or otherwise support a means for transmitting, to the UE, an indication that the base station rejected the requested bitrate based on determining to reject the requested bitrate.

In some examples, the bitrate request rejection component 1050 may be configured as or otherwise support a means for refraining from transmitting a message to the UE indicating that the base station rejected the requested bitrate based on determining to reject the requested bitrate.

In some examples, to support receiving the requested bitrate, the bitrate recommendation reception component 1025 may be configured as or otherwise support a means for receiving a medium access control message including a logical channel identifier, where the logical channel identifier indicates the requested bitrate.

In some examples, the requested bitrate includes an indication to increase a current bitrate or decrease the current bitrate being used for communications between the UE and the base station.

Figure 11:
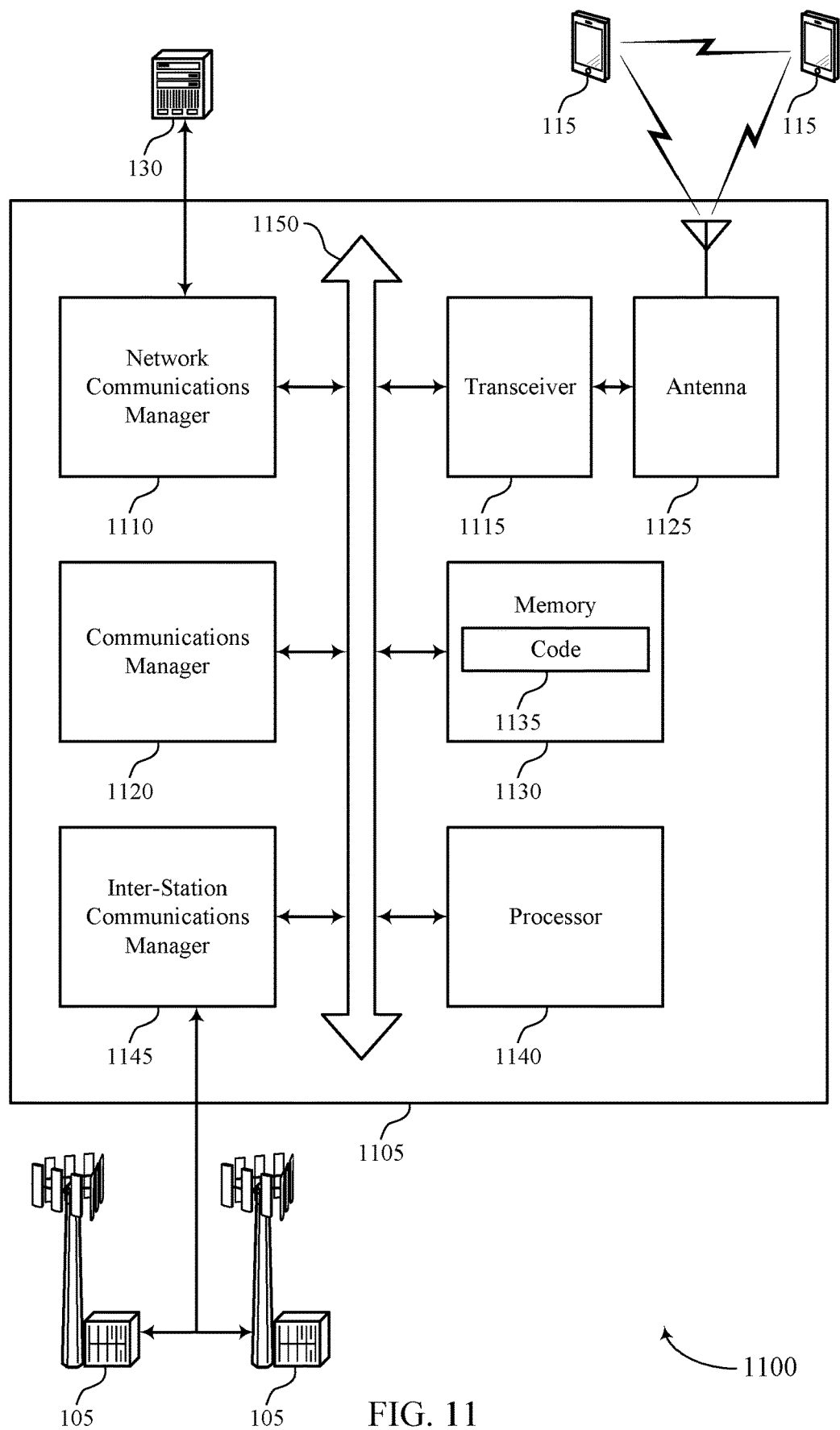
FIG. 11 shows a diagram of a system including a device that supports techniques for configuring a bitrate request in accordance with aspects of the present disclosure.

FIG. 11 shows a diagram of a system 1100 including a device 1105 that supports techniques for configuring a bitrate request in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for configuring a bitrate request). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a base station in accordance with examples as disclosed herein. For example, the communications manager 1120 may be configured as or otherwise support a means for receiving, from a UE, prior to transmitting a bitrate recommendation to the UE, a requested bitrate for communications between the UE and the base station. The communications manager 1120 may be configured as or otherwise support a means for determining whether to accept the requested bitrate. The communications manager 1120 may be configured as or otherwise support a means for performing the communications with the UE in accordance with the determination.

By including or configuring the communications manager 1120 in accordance with examples as described herein, the device 1105 may support techniques for improved communication reliability, reduced latency, more efficient utilization of communication resources, and improved coordination between devices.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for configuring a bitrate request as described herein, or the processor 1140 and the memory 1130 may be otherwise configured to perform or support such operations.

Figure 12:
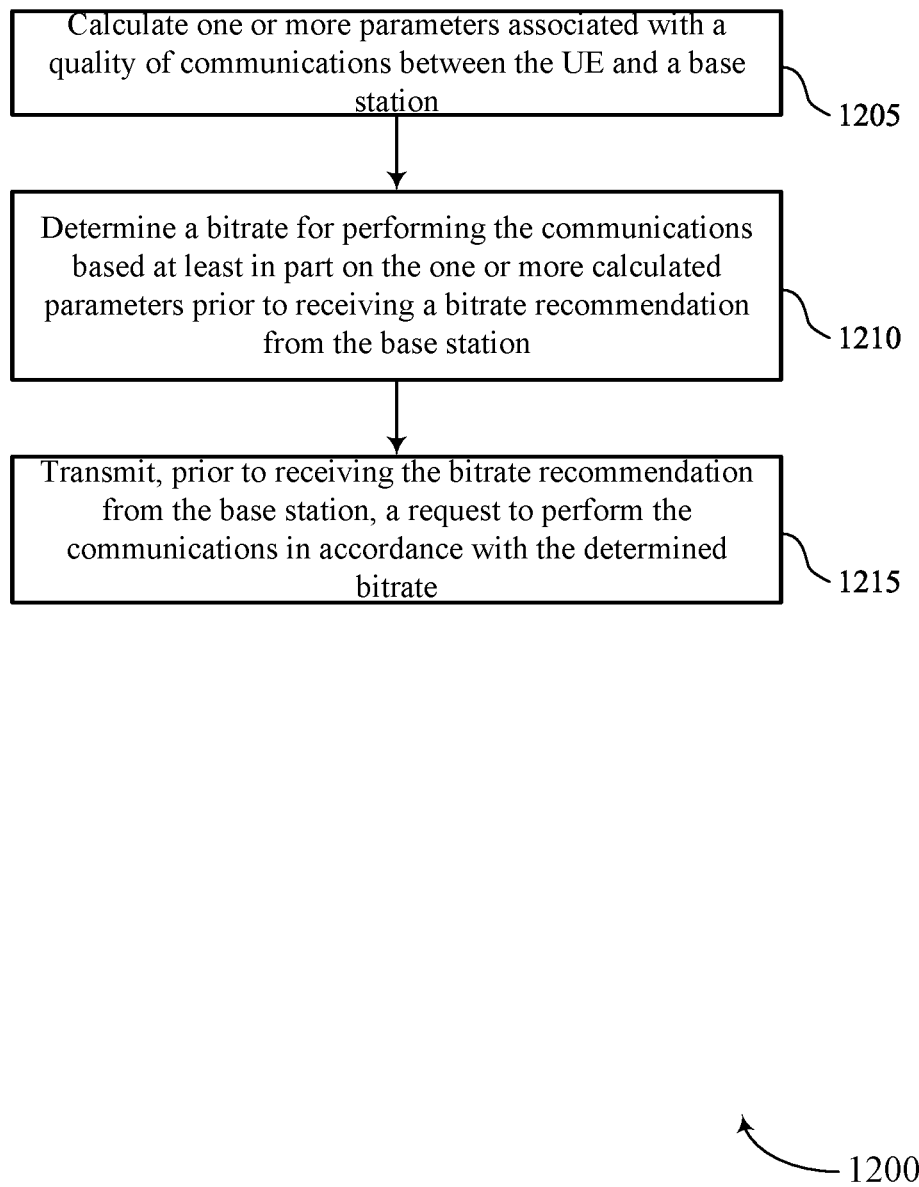
FIGS. 12 through 15 show flowcharts illustrating methods that support techniques for configuring a bitrate request in accordance with aspects of the present disclosure.

FIG. 12 shows a flowchart illustrating a method 1200 that supports techniques for configuring a bitrate request in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include calculating one or more parameters associated with a quality of communications between the UE and a base station. The operations of 1205 may be performed in accordance with examples as disclosed herein. In some examples, aspects of the operations of 1205 may be performed by a parameter calculation manager 625 as described with reference to FIG. 6.

At 1210, the method may include determining a bitrate for performing the communications based on the one or more calculated parameters prior to receiving a bitrate recommendation from the base station. The operations of 1210 may be performed in accordance with examples as disclosed herein. In some examples, aspects of the operations of 1210 may be performed by a bitrate determination manager 630 as described with reference to FIG. 6.

At 1215, the method may include transmitting, prior to receiving the bitrate recommendation from the base station, a request to perform the communications in accordance with the determined bitrate. The operations of 1215 may be performed in accordance with examples as disclosed herein. In some examples, aspects of the operations of 1215 may be performed by a bitrate request manager 635 as described with reference to FIG. 6.

Figure 13:
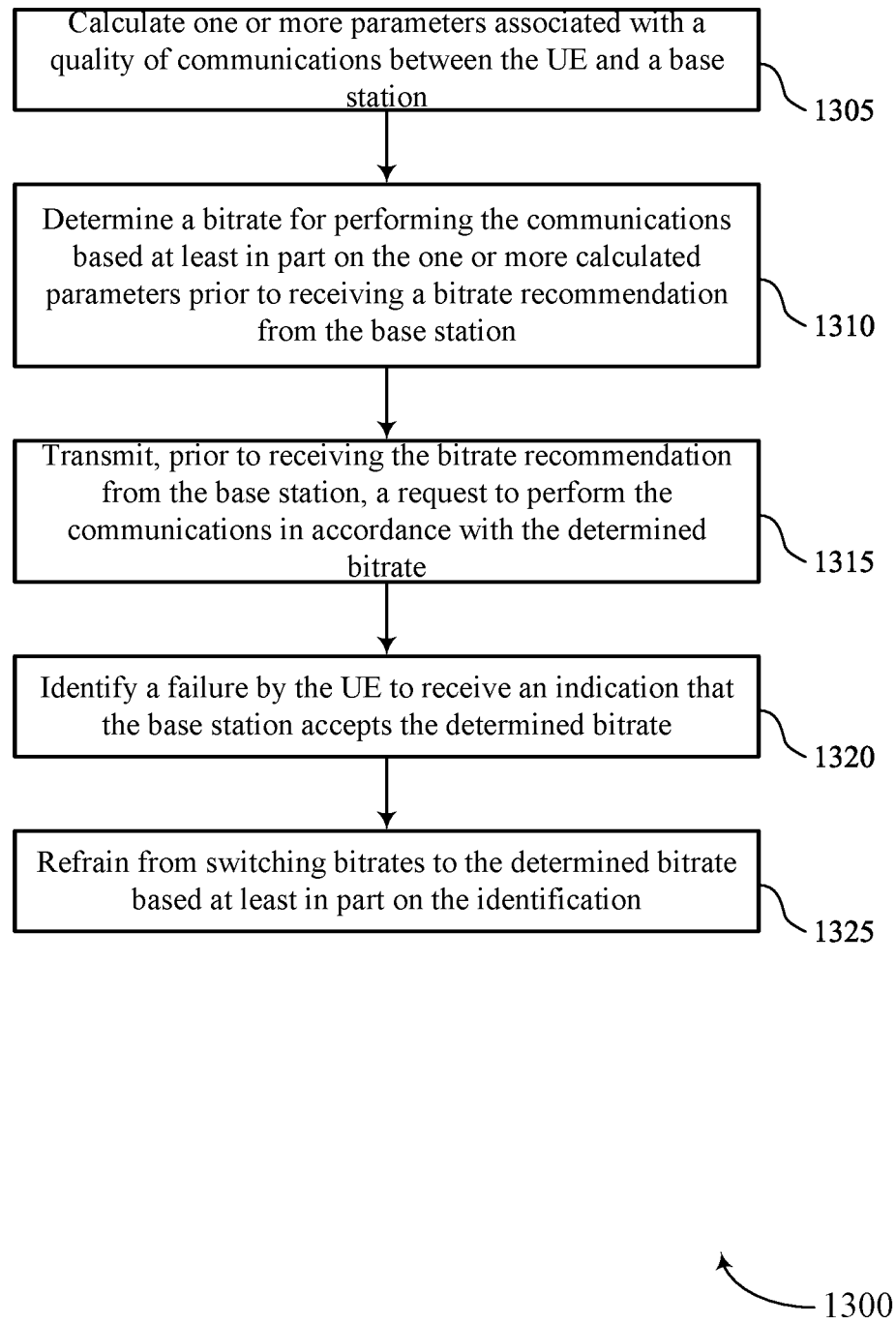

FIG. 13 shows a flowchart illustrating a method 1300 that supports techniques for configuring a bitrate request in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include calculating one or more parameters associated with a quality of communications between the UE and a base station. The operations of 1305 may be performed in accordance with examples as disclosed herein. In some examples, aspects of the operations of 1305 may be performed by a parameter calculation manager 625 as described with reference to FIG. 6.

At 1310, the method may include determining a bitrate for performing the communications based on the one or more calculated parameters prior to receiving a bitrate recommendation from the base station. The operations of 1310 may be performed in accordance with examples as disclosed herein. In some examples, aspects of the operations of 1310 may be performed by a bitrate determination manager 630 as described with reference to FIG. 6.

At 1315, the method may include transmitting, prior to receiving the bitrate recommendation from the base station, a request to perform the communications in accordance with the determined bitrate. The operations of 1315 may be performed in accordance with examples as disclosed herein. In some examples, aspects of the operations of 1315 may be performed by a bitrate request manager 635 as described with reference to FIG. 6.

At 1320, the method may include identifying a failure by the UE to receive an indication that the base station accepts the determined bitrate. The operations of 1320 may be performed in accordance with examples as disclosed herein. In some examples, aspects of the operations of 1320 may be performed by a bitrate request rejection manager 650 as described with reference to FIG. 6.

At 1325, the method may include refraining from switching bitrates to the determined bitrate based on the identification. The operations of 1325 may be performed in accordance with examples as disclosed herein. In some examples, aspects of the operations of 1325 may be performed by a bitrate request rejection manager 650 as described with reference to FIG. 6.

Figure 14:
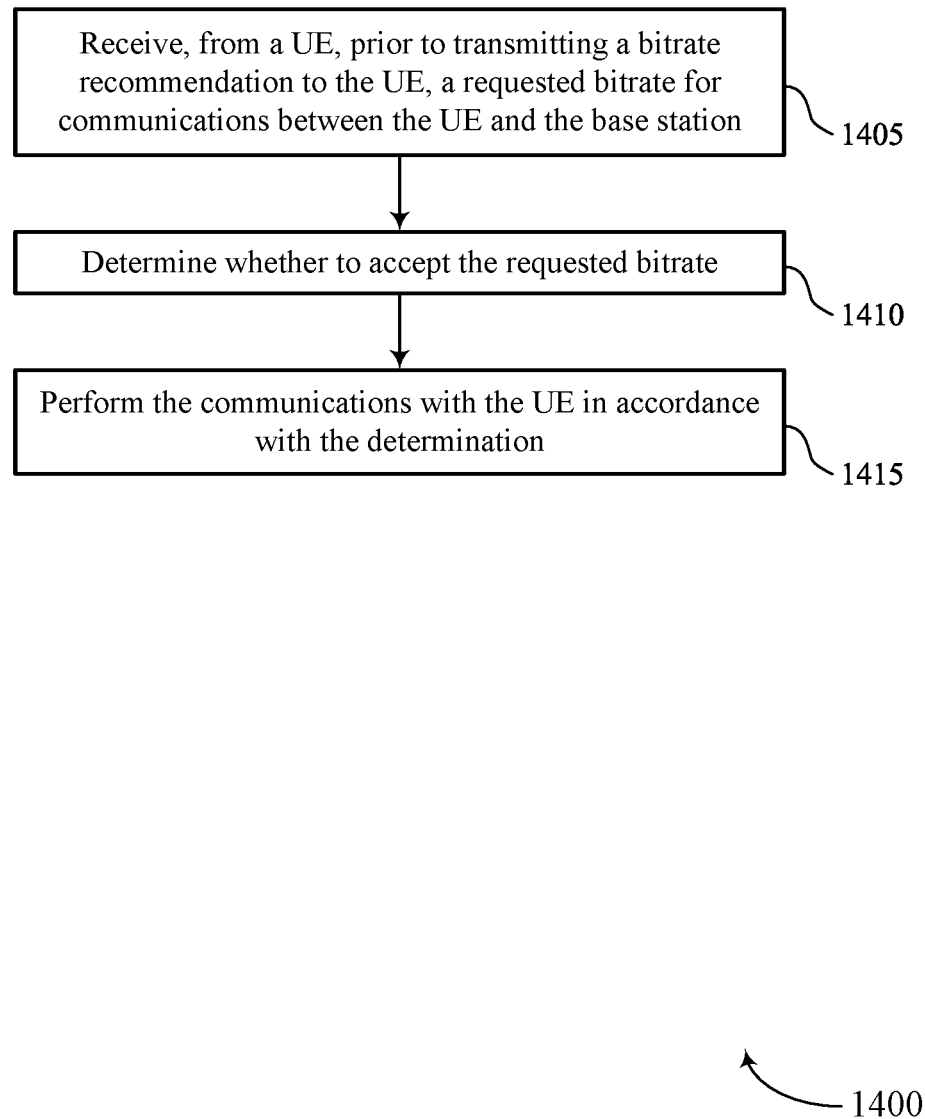

FIG. 14 shows a flowchart illustrating a method 1400 that supports techniques for configuring a bitrate request in accordance with aspects of the present disclosure. The operations of the method 1400 may be implemented by a base station or its components as described herein. For example, the operations of the method 1400 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1405, the method may include receiving, from a UE, prior to transmitting a bitrate recommendation to the UE, a requested bitrate for communications between the UE and the base station. The operations of 1405 may be performed in accordance with examples as disclosed herein. In some examples, aspects of the operations of 1405 may be performed by a bitrate recommendation reception component 1025 as described with reference to FIG. 10.

At 1410, the method may include determining whether to accept the requested bitrate. The operations of 1410 may be performed in accordance with examples as disclosed herein. In some examples, aspects of the operations of 1410 may be performed by a bitrate request evaluation component 1030 as described with reference to FIG. 10.

At 1415, the method may include performing the communications with the UE in accordance with the determination. The operations of 1415 may be performed in accordance with examples as disclosed herein. In some examples, aspects of the operations of 1415 may be performed by a communications performing component 1035 as described with reference to FIG. 10.

Figure 15:
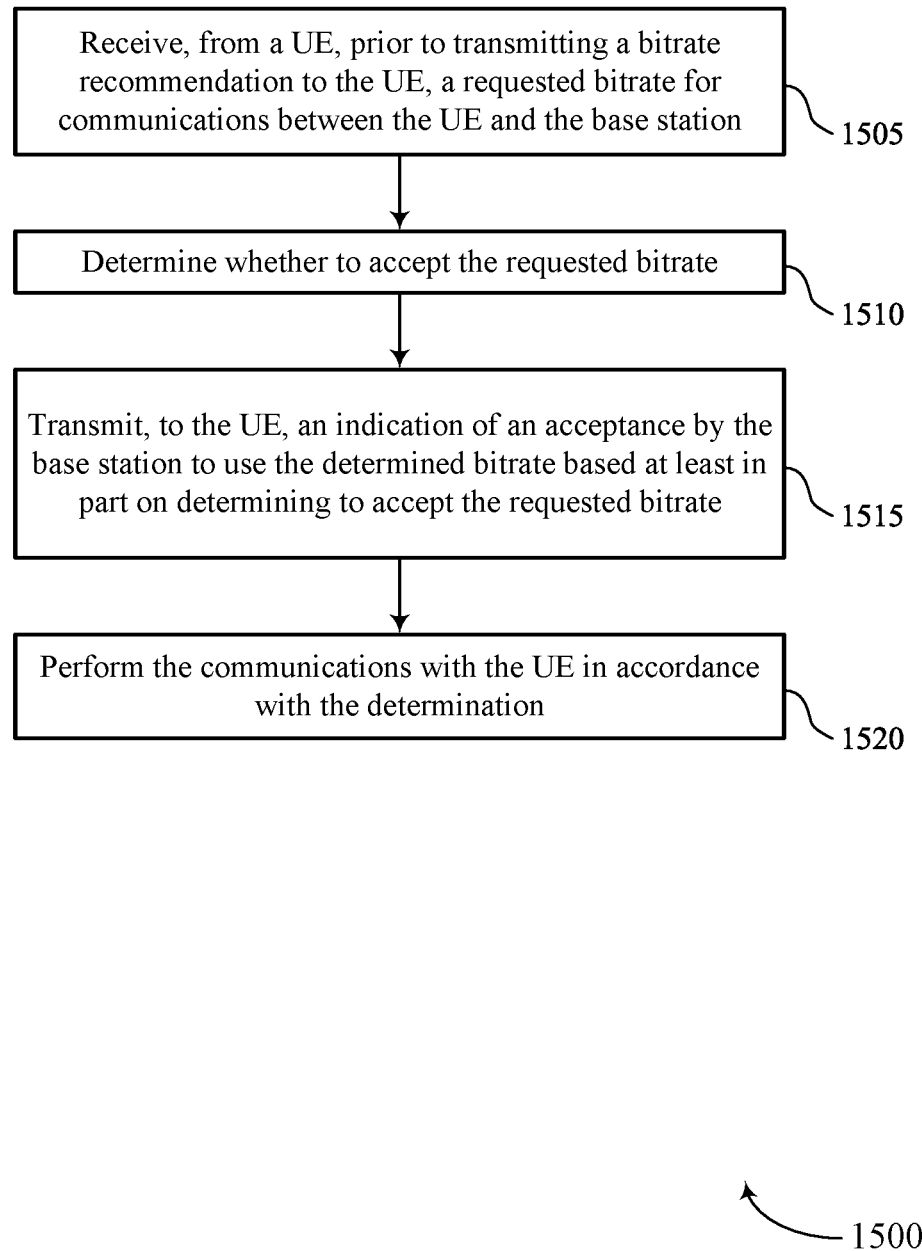

FIG. 15 shows a flowchart illustrating a method 1500 that supports techniques for configuring a bitrate request in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include receiving, from a UE, prior to transmitting a bitrate recommendation to the UE, a requested bitrate for communications between the UE and the base station. The operations of 1505 may be performed in accordance with examples as disclosed herein. In some examples, aspects of the operations of 1505 may be performed by a bitrate recommendation reception component 1025 as described with reference to FIG. 10.

At 1510, the method may include determining whether to accept the requested bitrate. The operations of 1510 may be performed in accordance with examples as disclosed herein. In some examples, aspects of the operations of 1510 may be performed by a bitrate request evaluation component 1030 as described with reference to FIG. 10.

At 1515, the method may include transmitting, to the UE, an indication of an acceptance by the base station to use the determined bitrate based on determining to accept the requested bitrate. The operations of 1515 may be performed in accordance with examples as disclosed herein. In some examples, aspects of the operations of 1515 may be performed by a bitrate request acceptance component 1040 as described with reference to FIG. 10.

At 1520, the method may include performing the communications with the UE in accordance with the determination. The operations of 1520 may be performed in accordance with examples as disclosed herein. In some examples, aspects of the operations of 1520 may be performed by a communications performing component 1035 as described with reference to FIG. 10.

The following provides an overview of aspects of the present disclosure:

Aspect 1: A method for wireless communications at a UE, comprising: calculating one or more parameters associated with a quality of communications between the UE and a base station; determining a bitrate for performing the communications based at least in part on the one or more calculated parameters prior to receiving a bitrate recommendation from the base station; and transmitting, prior to receiving the bitrate recommendation from the base station, a request to perform the communications in accordance with the determined bitrate.

Aspect 2: The method of aspect 1, further comprising: receiving, from the base station, an indication of an acceptance by the base station to use the determined bitrate.

Aspect 3: The method of aspect 2, wherein receiving the indication of the acceptance further comprises: receiving the bitrate recommendation after transmitting the request, wherein the bitrate recommendation comprises the determined bitrate.

Aspect 4: The method of aspect 3, wherein receiving the bitrate recommendation further comprises: receiving a medium access control message comprising a logical channel identifier, wherein the logical channel identifier indicates the determined bitrate.

Aspect 5: The method of any of aspects 1 through 4, further comprising: receiving, from the base station after transmitting the request, the bitrate recommendation, wherein the bitrate recommendation is different than the determined bitrate.

Aspect 6: The method of aspect 5, wherein receiving the bitrate recommendation further comprises: receiving a medium access control message comprising a logical channel identifier, wherein the logical channel identifier indicates the bitrate recommendation.

Aspect 7: The method of any of aspects 1 through 6, further comprising: receiving, from the base station, an indication that the base station rejected the determined bitrate.

Aspect 8: The method of any of aspects 1 through 7, further comprising: identifying a failure by the UE to receive an indication that the base station accepts the determined bitrate; and refraining from switching bitrates to the determined bitrate based at least in part on the identification.

Aspect 9: The method of any of aspects 1 through 8, further comprising: starting a bitrate request timer upon transmitting the request; and refraining from transmitting a second request while the bitrate request timer is running.

Aspect 10: The method of aspect 9, further comprising: identifying that the bitrate request timer has expired; and transmitting the second request to perform the communications in accordance with the determined bitrate.

Aspect 11: The method of any of aspects 1 through 10, wherein transmitting the request further comprises: transmitting a medium access control message comprising a logical channel identifier, wherein the logical channel identifier indicates the request.

Aspect 12: The method of any of aspects 1 through 11, wherein calculating one or more parameters further comprises: calculating a jitter, a delay, a reference signal received quality, a signal-to-interference-plus-noise ratio, or a combination thereof associated with communications between the UE and the base station.

Aspect 13: The method of any of aspects 1 through 12, wherein the request comprises an indication to increase a current bitrate or decrease the current bitrate being used for communications between the UE and the base station.

Aspect 14: A method for wireless communications at a base station, comprising: receiving, from a UE, prior to transmitting a bitrate recommendation to the UE, a requested bitrate for communications between the UE and the base station; determining whether to accept the requested bitrate; and performing the communications with the UE in accordance with the determination.

Aspect 15: The method of aspect 14, further comprising: transmitting, to the UE, an indication of an acceptance by the base station to use the determined bitrate based at least in part on determining to accept the requested bitrate.

Aspect 16: The method of aspect 15, wherein transmitting the indication of the acceptance further comprises: transmitting the bitrate recommendation after receiving the requested bitrate, wherein the bitrate recommendation comprises the requested bitrate.

Aspect 17: The method of aspect 16, wherein transmitting the bitrate recommendation further comprises: transmitting a medium access control message comprising a logical channel identifier, wherein the logical channel identifier indicates the requested bitrate.

Aspect 18: The method of any of aspects 14 through 17, further comprising: transmitting, to the UE after receiving the requested bitrate, the bitrate recommendation, wherein the bitrate recommendation is different than the requested bitrate.

Aspect 19: The method of aspect 18, wherein transmitting the bitrate recommendation further comprises: transmitting a medium access control message comprising a logical channel identifier, wherein the logical channel identifier indicates the bitrate recommendation.

Aspect 20: The method of any of aspects 14 through 19, further comprising: transmitting, to the UE, an indication that the base station rejected the requested bitrate based at least in part on determining to reject the requested bitrate.

Aspect 21: The method of any of aspects 14 through 20, further comprising: refraining from transmitting a message to the UE indicating that the base station rejected the requested bitrate based at least in part on determining to reject the requested bitrate.

Aspect 22: The method of any of aspects 14 through 21, wherein receiving the requested bitrate further comprises: receiving a medium access control message comprising a logical channel identifier, wherein the logical channel identifier indicates the requested bitrate.

Aspect 23: The method of any of aspects 14 through 22, wherein the requested bitrate comprises an indication to increase a current bitrate or decrease the current bitrate being used for communications between the UE and the base station.

Aspect 24: An apparatus for wireless communications, comprising a processor; memory coupled with the processor; and instructions stored in the memory and executable by the processor to cause the apparatus to perform a method of any of aspects 1 through 13.

Aspect 25: An apparatus for wireless communications, comprising at least one means for performing a method of any of aspects 1 through 13.

Aspect 26: A non-transitory computer-readable medium storing code for wireless communications, the code comprising instructions executable by a processor to perform a method of any of aspects 1 through 13.

Aspect 27: An apparatus for wireless communications, comprising a processor; memory coupled with the processor; and instructions stored in the memory and executable by the processor to cause the apparatus to perform a method of any of aspects 14 through 23.

Aspect 28: An apparatus for wireless communications, comprising at least one means for performing a method of any of aspects 14 through 23.

Aspect 29: A non-transitory computer-readable medium storing code for wireless communications, the code comprising instructions executable by a processor to perform a method of any of aspects 14 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    calculating one or more parameters associated with a quality of communications between the UE and a base station;
    determining a bitrate for performing the communications that is based at least in part on the one or more calculated parameters prior to receiving a bitrate recommendation from the base station;
    transmitting, prior to receiving the bitrate recommendation from the base station, a request to perform the communications in accordance with the determined bitrate; and
    receiving the bitrate recommendation after transmitting the request, wherein the bitrate recommendation is indicated by a logical channel identifier that is included in a medium access control message, and wherein the logical channel identifier indicates the determined bitrate that is based at least in part on the one or more calculated parameters.

2. The method of claim 1, further comprising:
    receiving, from the base station, an indication of an acceptance by the base station to use the determined bitrate.

3. The method of claim 1, further comprising:
    receiving, from the base station after transmitting the request, the bitrate recommendation, wherein the bitrate recommendation is different than the determined bitrate.

4. The method of claim 3, wherein receiving the bitrate recommendation further comprises:
    receiving a medium access control message comprising a logical channel identifier, wherein the logical channel identifier indicates the bitrate recommendation.

5. The method of claim 1, further comprising:
    identifying a failure by the UE to receive an indication that the base station accepts the determined bitrate; and
    refraining from switching bitrates to the determined bitrate based at least in part on the identification.

6. The method of claim 1, further comprising:
    starting a bitrate request timer upon transmitting the request; and
    refraining from transmitting a second request while the bitrate request timer is running.

7. The method of claim 6, further comprising:
    identifying that the bitrate request timer has expired; and
    transmitting the second request to perform the communications in accordance with the determined bitrate.

8. The method of claim 1, wherein transmitting the request further comprises:
transmitting a medium access control message comprising a logical channel identifier, wherein the logical channel identifier indicates the request.

9. The method of claim 1, wherein calculating one or more parameters further comprises:
calculating a jitter, a delay, a reference signal received quality, a signal-to-interference-plus-noise ratio, or a combination thereof associated with communications between the UE and the base station.

10. The method of claim 1, wherein the request comprises an indication to increase a current bitrate or decrease the current bitrate being used for communications between the UE and the base station.

11. A method for wireless communications at a base station, comprising:
receiving, from a user equipment (UE), prior to transmitting a bitrate recommendation to the UE, a requested bitrate for communications between the UE and the base station;
determining whether to accept the requested bitrate;
transmitting the bitrate recommendation after receiving the requested bitrate from the UE, wherein the bitrate recommendation is indicated by a logical channel identifier that is included in a medium access control message, and wherein the logical channel identifier indicates the requested bitrate; and
performing the communications with the UE in accordance with the determination.

12. The method of claim 11, further comprising:
transmitting, to the UE, an indication of an acceptance by the base station to use the determined bitrate based at least in part on determining to accept the requested bitrate.

13. The method of claim 11, further comprising:
transmitting, to the UE after receiving the requested bitrate, the bitrate recommendation, wherein the bitrate recommendation is different than the requested bitrate.

14. The method of claim 13, wherein transmitting the bitrate recommendation further comprises:
transmitting a medium access control message comprising a logical channel identifier, wherein the logical channel identifier indicates the bitrate recommendation.

15. The method of claim 11, wherein receiving the requested bitrate further comprises:
receiving a medium access control message comprising a logical channel identifier, wherein the logical channel identifier indicates the requested bitrate.

16. The method of claim 11, wherein the requested bitrate comprises an indication to increase a current bitrate or decrease the current bitrate being used for communications between the UE and the base station.

17. An apparatus for wireless communications, comprising:
a processor;
memory coupled with the processor; and
instructions stored in the memory and executable by the processor to cause the apparatus to:
calculate one or more parameters associated with a quality of communications between a user equipment (UE) and a base station;
determine a bitrate for performing the communications that is based at least in part on the one or more calculated parameters prior to receiving a bitrate recommendation from the base station;
transmit, prior to receiving the bitrate recommendation from the base station, a request to perform the communications in accordance with the determined bitrate; and
receive the bitrate recommendation after transmitting the request, wherein the bitrate recommendation is indicated by a logical channel identifier that is included in a medium access control message, and wherein the logical channel identifier indicates the determined bitrate that is based at least in part on the one or more calculated parameters.

18. The apparatus of claim 17, wherein the instructions are further executable by the processor to cause the apparatus to:
receive, from the base station, an indication of an acceptance by the base station to use the determined bitrate.

19. The apparatus of claim 17, wherein the instructions are further executable by the processor to cause the apparatus to:
receive, from the base station after transmitting the request, the bitrate recommendation, wherein the bitrate recommendation is different than the determined bitrate.

20. The apparatus of claim 17, wherein the instructions are further executable by the processor to cause the apparatus to:
start a bitrate request timer upon transmitting the request; and
refrain from transmitting a second request while the bitrate request timer is running.

21. The apparatus of claim 20, wherein the instructions are further executable by the processor to cause the apparatus to:
identify that the bitrate request timer has expired; and
transmit the second request to perform the communications in accordance with the determined bitrate.

22. An apparatus for wireless communications, comprising:
a processor;
memory coupled with the processor; and
instructions stored in the memory and executable by the processor to cause the apparatus to:
receive, from a user equipment (UE), prior to transmitting a bitrate recommendation to the UE, a requested bitrate for communications between the UE and a base station;
determine whether to accept the requested bitrate;
transmit the bitrate recommendation after receiving the requested bitrate from the UE, wherein the bitrate recommendation is indicated by a logical channel identifier that is included in a medium access control message, and wherein the logical channel identifier indicates the requested bitrate; and
perform the communications with the UE in accordance with the determination.

23. The apparatus of claim 22, wherein the instructions are further executable by the processor to cause the apparatus to:
transmit, to the UE, an indication of an acceptance by the base station to use the determined bitrate based at least in part on determining to accept the requested bitrate.

24. The apparatus of claim 22, wherein the instructions are further executable by the processor to cause the apparatus to:

transmit, to the UE after receiving the requested bitrate, the bitrate recommendation, wherein the bitrate recommendation is different than the requested bitrate.

\* \* \* \* \*